US010476877B2

(12) United States Patent
Nixon et al.

(10) Patent No.: US 10,476,877 B2
(45) Date of Patent: Nov. 12, 2019

(54) NETWORK-ACCESSIBLE RESOURCE MANAGEMENT SYSTEM WITH DISTRIBUTABLE GOVERNANCE

(71) Applicant: INODZ IP CO., The Valley (AI)

(72) Inventors: Brian Gregory Nixon, Ottawa (CA); Joel Laughlin Grant, Ottawa (CA)

(73) Assignee: INODZ IP CO., The Valley (AI)

( * ) Notice: Subject to any disclaimer, the term of this patent is extended or adjusted under 35 U.S.C. 154(b) by 0 days.

(21) Appl. No.: 15/537,625

(22) PCT Filed: Dec. 18, 2015

(86) PCT No.: PCT/CA2015/051352
§ 371 (c)(1),
(2) Date: Jun. 19, 2017

(87) PCT Pub. No.: WO2016/095056
PCT Pub. Date: Jun. 23, 2016

(65) Prior Publication Data
US 2018/0091516 A1    Mar. 29, 2018

(30) Foreign Application Priority Data
Dec. 19, 2014  (CA) ...................................... 2875774

(51) Int. Cl.
*H04L 29/06* (2006.01)
*G06Q 10/06* (2012.01)

(52) U.S. Cl.
CPC .......... *H04L 63/101* (2013.01); *G06Q 10/06* (2013.01); *H04L 63/20* (2013.01); *G06Q 10/067* (2013.01)

(58) Field of Classification Search
CPC .............................. H04L 63/101; H04L 63/20
See application file for complete search history.

(56) References Cited

U.S. PATENT DOCUMENTS 7,185,047 B1 * 2/2007 Bate ........................ H04L 63/08
709/202

OTHER PUBLICATIONS

Wooldridge et al., The Gaia Methodology for Agent-Oriented Analysis and Design, Autonomous Agents and Multi-Agent Systems, 3, 285-312, 2000, 28 pages (Year: 2000).*

(Continued)

*Primary Examiner* — Oleg Korsak
(74) *Attorney, Agent, or Firm* — Knobbe, Martens, Olson & Bear, LLP

(57) ABSTRACT

A resource management system comprising a computer-implemented platform running on at least one computing device, said platform for running a plurality of interoperable resource agents, each resource agent being a representation of at least an aspect of a 5 resource, wherein at least one aspect of governance of each said resource agent is distributable by a first rights holder to any one or more second rights holder; and a communications interface for interfacing said platform and at least one resource-related computing device, each resource-related computing device associated via said communications interface with at least one of said resource agents in accordance with an 10 access contract; wherein governance comprises the ability to authorize the further distribution of any one or more aspect of governance by the at least one second rights holder over at least an aspect of the resource agent over which the first user has governance.

31 Claims, 36 Drawing Sheets

(56) References Cited

OTHER PUBLICATIONS

Gusmeroli, et al., "IoT Access Control Issues: A Capability based Approach", 2012 Sixth International Conference on Innovative Mobile and Internet Services in Ubiquitous Computing, 2012, 6 pp.
Leppanen, et al., "Mobile Agents for Integration of internet of Things and Wireless Sensor Networks", 2013 IEEE International Conference of Systems, Man and Cybernetics, 2013, 8 pp.
CIPO Examiner's Report, dated Aug. 10, 2017 for Canadian Application No. 2,970,951.
CIPO Response to the Aug. 10, 2017 Examiner's Report (and copies of the clean and backline claims), filed Nov. 10, 2017 for Canadian Application No. 2,970,951.
CIPO Examiner's Report, dated Nov. 30, 2017 for Canadian Application No. 2,970,951.
CIPO Response to the Nov. 30, 2017 Examiner's Report (and copies of the clean and backline claims), filed Dec. 15, 2017 for Canadian Application No. 2,970,951.
CIPO Notice of Allowance dated Dec. 27, 2017 for Canadian Application No. 2,970,951.
Extended Search Report dated May 2, 2018 for European Patent Application No. 15868798.8, in 9 pages.
194.66.75.254 et al: Capability-based security, Wikipedia-the free encyclopedia, Dec. 5, 2014, pp. 1-5, XP055469076, retrieved from the Internet: URL: https://en.wikipedia.org/w/index.php?title=Capability-based_security&oldid=636757433 [retrieved on Apr. 20, 2018].

* cited by examiner iDNA Syntax protocol://domain:port/path?operation#parameter

NETWORK-ACCESSIBLE RESOURCE MANAGEMENT SYSTEM WITH DISTRIBUTABLE GOVERNANCE

FIELD OF THE DISCLOSURE

The present disclosure relates to methods, systems and devices relating to network-accessible resource management system, method and platform, and distributable resource governance method and system associated therewith, including the platforms for creating interoperable autonomous agents representative of such resources and interfaces therefor.

BACKGROUND

According to some sources, there will be more than 30 billion devices wirelessly connected to the "Internet of Things" by 2020. While much of the wireless communication will be between machines (M2M), increasingly solutions will be required to manage resources that are not just machines but also non-computing physical resources, including people, places and things. While a number of solutions have been developed to manage the growing number of disparate devices, common among these is that the platform owner maintains governance over the management of the devices to ensure their ownership over the usage and the associated business models. Open governance has not heretofore been an option for resource-owners/-users but once it becomes available for some resources, following historical models relating to privately held closed resources, those on closed networks will be forced to open governance if they wish to remain relevant with the broader domain of resource-owners and -users. Such owners and/or users will simply move to those resources that provide open governance.

Existing resource management platforms exert a fundamental level of control over resources on the internet of things. While some systems permit some level of access to resources or control, the ability to pass on ownership and/or governance over resources to other users without regard or authorization from the platform owner is limited. This is because the fundamental building blocks of resource management are centralized at the resource platform, rather than in the domain of the resource owner/user, or their delegate. As such, complete autonomy, notably including the ability to create virtualized resources related to physical resources and then distribute governance over such resources is necessarily limited. Certain functionality is necessarily located on and controlled by the platform. These fundamental building blocks include: accreditation, access, security, authentication, statefulness, availability, domain assurance, audit tracking, authorization, and administrative functions.

Currently, any network of "things" is closed and the barrier to entry is the governance of each closed network. Such closure is evident in the architecture of resource management platforms. Ultimately, the platform administrator, while they may distribute some level of access and control to resource owners (or rights holders), maintains control over governance functions; including the right to distribute to others the full governance functions.

SUMMARY

The following presents a simplified summary of the general inventive concept(s) described herein to provide a basic understanding of some aspects of the invention. This summary is not an extensive overview of the invention. It is not intended to restrict key or critical elements of the invention or to delineate the scope of the invention beyond that which is explicitly or implicitly described by the following description and claims.

A need exists for methods, systems and devices for relating to universal resource management with distributable governance.

For instance, there is a need for a network-accessible resource management system, method and platform that overcomes at least some of the drawbacks of known systems, or at least, provides a useful alternative thereto. For example, the below-described embodiments describe, in some aspects, a distributable resource governance method and system for such resource management systems.

In accordance with one aspect, there is provided a resource management system for managing remote access to a resource over a network, the system comprising: a network-accessible resource management platform having stored in association therewith a resource agent representing a corresponding resource-specific aspect of the resource, said resource agent having associated therewith selectively distributable digital resource governance permissions selectively distributable by an existing governance rights holder associated with said resource-specific aspect to a downstream governance rights holder, wherein said selectively distributable resource governance permissions comprise a distribution permission, which, if granted by said existing governance rights holder, allows said downstream governance rights holder to further distribute governance over said resource-specific aspect to a further downstream governance rights holder; and a communication interface to said platform, wherein the resource has associated therewith a resource-related network-accessible computing device addressable via said interface and said resource agent to provide remote access to said resource in accordance with a designated resource-specific access criteria.

In accordance with another aspect, there is provided a communications interface for interfacing a resource-related computing device with a computer-implemented platform of resource agents, each of said resource agents representing a corresponding resource-specific aspect of a resource associated with the resource-related computing device, the interface comprising: at least one processor; and at least one network-enabled interface having access to said computer-implemented platform, said network-enabled interface configured to accept interoperability information relating to a communications protocol from an existing rights holder, said interoperability information configured to enable communications to the platform by the resource-related computing device that communicates in accordance with said communications protocol; wherein said interoperability information has associated therewith distributable digital resource governance permissions distributable by said existing rights holder to a downstream rights holder, wherein said distributable resource governance permissions comprise a distribution permission, which, if granted by said existing rights holder, allows said downstream rights holder to further distribute governance over said interoperability information to a further downstream rights holder.

In accordance with another aspect, there is provided a computer-implemented resource agent for digitally managing a resource via a communications interface with a resource-related computing device associated with the resource, said resource agent representing at least one resource-specific aspect of the resource and having associated therewith distributable digital resource governance permissions distributable by an existing rights holder associated with said resource-specific aspect to a downstream rights holder, said resource agent including designated resource-specific access criteria associated with said resource-related computing device for making said at least one aspect of the resource available to said existing rights holder, wherein said distributable resource governance permissions comprise a distribution permission, which, if granted by said existing rights holder, allows said downstream rights holder to further distribute governance over the resource agent to said downstream rights holder.

In accordance with one aspect, there is provided a resource management system for managing remote access to at least one resource over a network, the system comprising a network-accessible resource management platform having stored in association therewith at least one resource agent, each at least one resource agent representing at least one resource-specific aspect of one of the multiple resources, each of said resource agents having associated therewith one or more distributable digital resource governance permissions distributable by a first rights holder associated with said resource-specific aspect to a second rights holder, wherein said one or more distributable resource governance permissions comprise a distribution permission, which, if granted by said first rights holder, allows said second rights holder to further distribute governance over said resource-specific aspect to one or more further rights holders; a communication interface to said platform, wherein each of the resources has associated therewith a resource-related network-accessible computing device addressable via said interface and a corresponding one of said resource agents to provide remote access to said resource represented thereby in accordance with one or more designated resource-specific access criteria.

In accordance with another aspect, there is provided a resource management system comprising a computer-implemented platform running on at least one computing device, said platform for instantiating a plurality of interoperable resource agents, each resource agent being a user-defined representation of at least an aspect of a resource, wherein at least one aspect of governance of each said resource agent is distributable by a first rights holder to any at least one second rights holder; and a communications interface for interfacing said at least one computing device and at least one resource-related computing device, each resource-related computing device associated via said communications interface with at least one first resource agent in accordance with an access contract; wherein governance comprises the ability to authorize the further distribution of any one or more aspect of governance by the at least one second rights holder over at least an aspect of the resource agent over which the first user has governance.

In accordance with another aspect, there is provided a communications interface for interfacing resource-related computing devices with a computer-implemented platform of resource agents, each said resource agent representing at least one resource-specific aspect of a resource associated with one of the resource-related computing devices, the interface comprising: at least one processor; and at least one network-enabled interface having access to said computer-implemented platform, said network-enabled interface configured to accept interoperability information relating to a communications protocol from a first rights holder, said interoperability information configured to enable communications to the platform by at least one resource-related computing device that communicates in accordance with said communications protocol; wherein said interoperability information having associated therewith one or more distributable digital resource governance permissions distributable by the first rights holder to a second rights holder, wherein said one or more distributable resource governance permissions comprise a distribution permission, which, if granted by said first rights holder, allows said second rights holder to further distribute governance over said interoperability information to one or more further rights holders.

In accordance with another aspect, there is provided a communications interface for interfacing one or more resource-related computing devices with a computer-implemented platform of interoperable resource agents, each said resource agent being a computer-implemented representation of a resource and being configured to manage in accordance with an access contract at least one aspect of said resource, the interface comprising at least one network interfaceable switching component having access to said computer-implemented platform, said switching component configured to accept a interoperability engine associated with a communications protocol from a first resource user, said interoperability engine configured to enable communications to the platform by at least one resource-related computing device that communicates in accordance with said communications protocol, wherein at least one aspect of governance of said interoperability engine is distributable by a first user to any at least one second user, wherein governance comprises the ability to authorize the further distribution of any one or more aspect of governance by the at least one second user over an aspect of the interoperability engine over which the first user has governance.

In accordance with another aspect, there is provided a computer-implemented resource agent for managing a resource via a communications interface with a resource-related computing device associated with the resource, said resource agent representing at least one resource-specific aspect of the resource and having associated therewith one or more distributable digital resource governance permissions distributable by a first rights holder associated with said resource-specific aspect to a second rights holder, said resource agent including designated resource-specific access criteria with said resource-related computing device for making at least one aspect of said resource available to a resource agent rights holder, wherein said one or more distributable resource governance permissions comprise a distribution permission, which, if granted by said first rights holder, allows said second rights holder to further distribute governance over said resource agent to one or more further rights holders.

In accordance with another aspect, there is provided a computer-implemented resource agent for managing a resource via a communications interface with a resource-related computing device, user-defined resource characteristics for the resource agent being stored in a registry, said resource characteristics including an access contract with said resource-related computing device for making at least one aspect of said resource available to a resource agent rights holder, at least one aspect of governance over at least one aspect of the resource agent being distributable by the resource agent rights holder to at least one second user, wherein governance comprises the ability to authorize the further distribution of any one or more aspect of governance by the at least one second user over an aspect of the resource agent over which the first user has governance.

In accordance with another aspect, there are provided methods for managing resources in accordance with one or more of the resource management systems, interfaces and resource agents disclosed herein, the method comprising:

creating one or more resource agents, each such resource agent representative of at least one resource-specific aspect of the resource and having associated therewith distributable digital resource governance permissions distributable by a first rights holder associated with said resource-specific aspect to a second rights holder resource-related computing device; assigning one or more distributable resource governance permissions to said resource agent, wherein one or more of said distributable resource governance permissions comprise a distribution permission, which, if granted by a first rights holder, allows a second rights holder to further distribute governance over said resource agent to one or more further rights holders. In some embodiments, the distributable resource governance permissions may comprise an ability to create additional resource agents based on the resource agent, to combine the resource agent or additional resource agents with other resource agents, to create orchestrations or choreographies comprising the resource agent or additional resource agents, among other distributable resource governance permissions disclosed herein. Said distributable resource governance permissions, in embodiments, are only limited (for both quantum and degree of divisibility of aspects of resources) for rights holders other than the creator (or other original rights holder of the resource agent) and then only to the extent that only some of the governance permissions have been distributed. The distribution of rights may either be accomplished by withholding existing permissions associated with the resource agent, or by generating new ones (and new aspects) associated with an additional resource agent, the additional resource agent being based on the resource agent.

In accordance with another aspect, there is provided a use of a resource management system disclosed herein for managing resources. Said use may, in some aspects, comprise obtaining information from a computer-implemented billing component for associating billing information, in some cases such billing information being further associated with a rights holder or a user of said resource agent, with usage of one or more of the following: the resource via the corresponding resource agent, the resource agent or the resource management platform.

Some of the embodiments of resource management systems disclosed herein provide a platform for user-generated and -controlled virtualized resources, which can be made available by resource owners (as, e.g., Resources-as-a-Service, or "RaaS"), wherein the virtualized resources are characterized by distributable governance. This governance over the nature of the resources that are created, over the types of relationships in which they engage with other resources, and over the responses generated in the context of such relationships, are made completely available to the resource owner without any control in the hands of the platform itself. The governance is distributable as the owner can then grant such governance to any other resource owner or resource on the platform: as the owner is able freely maximize exploitation of such governance, it becomes Governance-as-a-Service ("GaaS").

The platform also facilitates communication between the virtualized resources and the physical resources that correspond with the virtualized resources via a centralized interoperability system, based on user-generated interoperability engines; control and governance of such interoperability engines, as with the resources themselves, are distributable by said user.

The degree of control over, and the distributability of such control over, the governance of each virtual resource and any applicable interoperability engine, via the services, are completely in the hands of the resource owner (or their delegate) and are independent of the resource platform domain. This therefore permits each virtual resource to act as an intelligent agent, completely autonomously from the associated resource management platform, which, in connection with the ability to interconnect any resources, whether on open or closed networks, are anticipated to drive a new resource owner-controlled paradigm in resource management. For the first time, any resource owner will be permitted to exploit all aspects of their available resources, which may comprise of any person, place, thing, or aspect thereof, while maintaining complete control over such resources, including the right to grant some or all of such control to others (to their own exclusion if desired)—or to cease such grant of governance. This is made possible by the concept of distributable governance, and driven by enabling the distributable governance as an exploitable service: GaaS.

Embodiments facilitate a self-organizing Internet-of-Things open marketplace where individuals have complete freedom to create and manage intelligent agents that are representations of their resources, which include people, place and things, to maximize exploitation. Embodiments deliver these capabilities via its Universal Resource Management Service (uRMS). uRMS is comprised of a RaaS Platform, GaaS capabilities (R3: Resource Relationship Response), and enabling services, which facilitate the creation of, and distribution of governance over, agents.

Embodiments comprise, among other things, platforms, systems and interfaces for universal resource management and provision. It further provides a means to create and control a meta-network of self-organizing resources, which represent real-world resources (people, places and things), wherein the governance over the resources is subject only to the resource-owner or their delegate or assignee, and such governance is completely distributable by that owner to other resources or resource owners. Embodiments further provide a centralized interface for permitting communication between resources that exist within both open and closed systems of resources.

Embodiments provide management of real-world and virtualized resources. Such management is fundamentally associated with the ability for any resource owner to generate a virtualized resource that can represent a real-world resource wherein the owner has complete governance over the domain of that resource and any aspect or sub-aspect thereof, and the owner can grant or distribute such governance—or aspect thereof—to any other entity. The ability to govern one's domain is held entirely by the resource owner, and such governance over that domain, or any aspect thereof, is distributable. Following historical economic trends that relate to resource scarcity and control, this fundamental ability will incentivize resource owners to establish their own self-governable resources, in the self-organizing network that established in embodiments, particularly because any owner of a new or existing resource, even those whose resources exist on a closed network, can generate, control, and distribute complete governance over, any virtualized resource. Moreover, virtualized resources of embodiments described herein are interfaceable with existing resource on open or close networks, they are session-oriented (i.e. stateful with respect to the applicable resource or resource-related computing device during use and therefore react to changes to or inter-communication therebetween in real-time), and they can interact with and respond to any other virtualized resource on the disclosed platforms autonomously (at least within such autonomy as they may have been granted) and intelligently.

In embodiments, distributable governance this is a result of the control over the resource agent "domain" by the resource owner, including the access contract with the resource, independently and distinct from the resource/resource platform. This control includes the ability to instantiate new resource agents, to create sub-resource agents and/or alias resource agents (i.e. resource agents having some aspect of another resource or having a different role/profile), the ability to interact with and respond to or accept response from other resource agents as determined by the resource agent rights holder, to combine with other resource agents, as well as myriad other functionalities, many of which—to the extent available at all—have heretofore been restricted to resource platform owners and administrators. This is due to both a financial (or other) incentive to maintain control over a set of resources, as well as logistical limitations of existing resource management platforms. As resource owners seek ways to open up their closed networks of resources onto embodiments herein, by generating virtualized resources and then interfacing the associated real-world resources with the resource management platforms described herein, competing resource management systems, in order to provide the same level of control may seek to enable similar access to their own closed networks.

Each interoperation autonomous virtualized resource, or resource agent, will operate as an intelligent agent, wherein the agent itself, not the platform administrator, will have complete control over the domain of that agent. This control includes both the ability to instantiate additional resource agent, which comprise some or all of the aspects of the resource agent in "children" resource agent, and also the ability to assign such control over the resource agent, or any child thereof, to another resource agent or resource agent rights holder; in other words, there is control over how and what kind of resource is presented on the platform depending on what aspects of a resource that are exposed by an applicable resource agent. The control also includes the ability to engage with, or be detectable by, another resource agent or resource agent rights holder; in other words, control over relationships. The control further includes the nature of the interactions between the resource agent and other resource agent or resource agent rights holders; in other words, control over response.

Without limiting the notion of governance, the following abilities are supported and distributable on the embodiments system: (i) resource agent creation and governance, (ii) the right to define resource agents, their characteristics, functionalities, policies, and services, (iii) the right to create, instantiate, and establish and enforce governance, and the (iv) the right to create, instantiate and establish governance of child resources or sub-resources. Distributability of governance by any user is technically limited only by the degree of governance granted to the rights holder carrying out the distribution (although there may be some contractual limitations placed on rights holders that would permit their removal from the system, i.e. there are contractual obligations to do no harm to any resource agent that has rights held by another).

Other aspects, features and/or advantages will become more apparent upon reading of the following non-restrictive description of specific embodiments thereof, given by way of example only with reference to the accompanying drawings.

BRIEF DESCRIPTION OF THE FIGURES

Several embodiments of the present disclosure will be provided, by way of examples only, with reference to the appended drawings, wherein.

DETAILED DESCRIPTION

Figure 1:
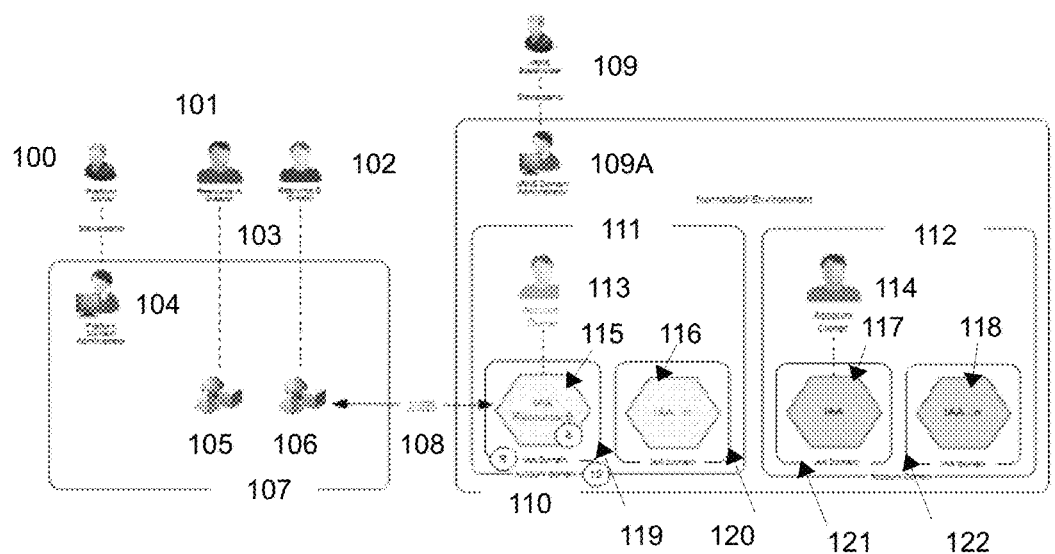
FIG. 1 is a diagrammatic representation of the architecture of a resource management system associated with a resource or set of resources in accordance with one embodiment.

The present invention will now be described more fully with reference to the accompanying schematic and graphical representations in which representative embodiments of the present invention are shown. The invention may however be embodied and applied and used in different forms and should not be construed as being limited to the exemplary embodiments set forth herein. Rather, these embodiments are provided so that this application will be understood in illustration and brief explanation in order to convey the true scope of the invention to those skilled in the art.

Embodiments of the subject matter described herein related to a resource management system with open governance. The open governance provides resource owners and users heretofore unavailable control and freedom over the use, utilization and exploitation of their resources. By putting such control and freedom into the hands of the resource owner, instead of the network owner (in some cases but not always the resource manufacturer or the entity that makes the resource available), there will be a significant ability and incentive to increase and drive the use, utilization and exploitation of resources. Open governance is enabled by, inter alia, an architecture that enables (1) full distributability of governance over a resource, which is unlimited in both magnitude (i.e. any and all rights can be distributed) and degree (i.e. any right and any portion thereof can be distributed); and (2) a segregation of, on the one hand, the domain of control of the resource agent by a resource owner from, on the other hand, the domain of control of the resources themselves and/or the domain of control of the resource management platform. By virtue of both existing system architectures, which puts resource network owners and administrators (and not resource owners) at the top of the top of any hierarchy of control, and historical business models, which derive value based on resource control rather than resource freedom, architectures that permit the freedom of governance, including the right to further distribute governance, have neither been possible nor was there any incentive to develop them.

In general, embodiments hereof describe systems, methods, devices and uses for establishing a network of interoperable and autonomous virtualized resources that are configured to be user-defined real-time representations of real-world resources, including people, places and things, or of any aspects of such resources (such virtualized resources being referred to herein as resource agents), providing an interface for connecting said resource agents to resources, and then providing an open governance model over the exploitation of such resources and resource agents. A resource agent is configured to be representative of (i) any resource, or (ii) of any aspect, profile, or characteristic of such resource, or (iii) any combination of any one or more resources or aspects, profiles, or characteristics thereof. In addition, a resource agent is in part defined by its access contract to the resource itself (or in cases where the resource is not network-enabled, to a resource-related computing device). Complete governance over both the identity, the characteristics, services, resource agent control, and access contract are held by the resource agent rights-holder, which is often the person who is or uses the resource, but it can include other delegates, such as another person or resource agent. Distributable governance provides the freedom to distribute such governance in respect of which (a) the quantum of distributability of such governance is limited only by the level of governance that has been granted to the distributing resource agent rights holder (if, for example, they have received authorization for some level of governance from another user or agent), and (b) there is no limit on the degree to which aspects of such governance can be distributed (e.g. any portion, characteristic, aspect, service, degree of control, temporal, geographical or any type other limitation, or data relating to the resource and/or the associated governance thereof—even such aspect is not explicitly defined as a part of the resource or governance associated with the distributed governance).

As such, a given resource agent rights-holder may sell, assign or otherwise transfer full rights to use and control a resource to another entity; alternatively, such rights-holder may transfer only a limited set of rights to another entity (e.g. another may use, control and distribute to others, services associated with such rights-holder's profile as call centre representative within a given date range from noon to 1 PM Eastern time in exchange for an agreed upon dollar amount), or they may transfer rights to aspects or characteristics of a resource (e.g. another may utilize the colour printing capacity of the rights-holder's network-connected printer for colour printing at any time) by permitting others to generate sub-resource agents, which are treated on the resource management platform as resource agents but may only have some portion of the functionality or range of services available from the resource agent from which it inherited the functionality. Indeed, provided that a guarantee of authority has not been distributed a part of the governance distribution, the original rights-holder may recall the governance previously distributed.

As an illustration, the previous example relating to printer resources can be used to demonstrate how the ability for another resource agent rights holder to combine, for example, aspects of resources relating to other printing resources, as resource agents themselves, with other resource agents, such as for example, possible third party resource agents associated with document delivery services, into a combined set of resource agents—or a container comprising resource agents, which itself may or may not be or may be presented as a single resource agent. Such container may be thus configured to provide real-time printing services that can be ordered according to any customized requirement available from the printing resources and then delivered to where they are required on-demand. The physical resource owner (or controller) can distribute any type of access and control rights to any other third party (and indeed, if the distributed governance permits it, revoke such rights) to fully exploit and utilize their resource optimally. On the other hand, the document delivery service provider has the ability to offer such a service because they have been granted certain governance and control rights over aspects of third-party resources, including the right to combine such resources with others, and even distribute aspects of governance over the combined set of resource aspects to even more third parties (e.g. to Staples™). By having such freedom over the distributability of governance, the resource owner/user (in this example, the owner of the printer), is afforded a means to optimally exploit and fully utilize their resource, all while having the option to maintain, and in this example, in fact maintaining, full control over the resource. The printer manufacturer, which under current resource governance and control paradigms wishes to maintain such control, will be incentivized to open governance because those purchasing other printers with open governance, once purchasers of such printers realize the benefits of open governance, will demand no less. As such, embodiments provide a resource management platform for generating and interconnecting user-defined, state-oriented, meta-resources, for virtualization of resources and aspects thereof (i.e. sub-resources), said virtualizations characterized by user-defined characteristics and semantics, wherein such virtualizations can be further user-definable with respect to their identity, their relationships, and their responses to other virtualized resources (i.e. a user can define whether they form part of a container, compilation, orchestration, choreography, profile, etc.).

Another aspect of subject matter disclosed herein relates to the ability to centralize communications protocols with resource-related computing devices through submission of such communication protocols (or standards) by a resource owner. Instead of pushing down additional hardware, software or firmware onto third-party devices to enable them to communicate with the resource management system, resource owners are given the capability of generating interoperability information relating to third-party and possibly proprietary communications protocols (referred to herein as interoperability engines) and submitting such information to the resource management system. This enables the possibility of other resources that share similar interoperability information to also communicate with the system. The governance model over such interoperability engines is similar to the resource agents: governance over the interoperability engine is entirely distributable by the resource owner/controller that submits the interoperability engine. Through centralization of interoperability engines, resources on formerly closed networks are able to be managed via an interoperable autonomous agent; as more closed networks of resources connect to the resource management system, other closed are incentivized to join even though for many closed networks, this means opening the governance to the resource owner rather than the network owner in order to meet resource owner demand. With respect to the architecture of embodiments herein, the access contract that exists between a resource and its related resource agents (either directly or indirectly) enforces the governance and control. The distinction between the resource-related computing device and/or networks thereof and the platform or resource agents, which is bridged and enforced by the access contract, ensures that governance over the control of the resource is captured wholly by the resource agent and not the owner of the resource network (and/or the manufacturer of the resource or entity that makes the resource available). As such, embodiments provide a communications interface between a platform for running a network of interconnected resource agents and resources, wherein the communications interface facilitates the interconnection of resources, including existing open and closed resources and/or open and closed networks of resources. In some embodiments, the communications interface can be viewed as a "cloud OS" in that it acts as interface or an abstraction layer exposing resources (and networks thereof) to the resource management platform and the resource agents thereof in the same way that an OS exposes functions of the hardware of a computing device. It may also be considered as a centralized interoperability broker between resources and/or resource networks, and between resources/networks of resources and resource agents. It is a provision of means of common interactivity between networks, resources, and services of resources.

In embodiments, the network of interoperable and user-defined resource agents that exhibit distributable governance are configured to behave as autonomous agents on behalf of their resource rights-holder (which may be an owner, or another rights-holder to which the owner or another properly authorized rights-holder has granted rights—which may include the right to establish governance). While each resource agent is representative of a resource, the resource rights-holder, since the domain of the resource management system has been removed from the resource network, retains governance over the resource agent and its control, via an access contract, over the resource (or in cases where the resource is not a network enabled person, place or thing, the resource-related computing device). Each resource agent may characterized as a discrete Internet service or set of services addressable at a specific URL/URI. The identity and characteristics of the resource agent are user-definable. Also forming part of the resource agent is the access contract between the resource agent and the resource (or, when applicable, the resource-related computing device). A resource agent rights holder may, assuming that have been granted sufficient governance authority, generate from any resource agent a sub-resource agent comprising of some or all aspects of the original resource agent. The sub-resource agent is itself a resource agent, and the aspects that it inherits from the original resource agent may comprise a profile, authorization limitations (e.g. including but not limited to temporal, geographical, service-based; as an illustrative example, only black and white printing between 1 AM ET and 6 AM ET for people with the city limits of The Valley), governance and/or governance distributability limitations, some or all characteristics of the original resource agent or the resource, some or all data associated with a resource, some or all of the services of the original resource agent or the resource, level of autonomy of the resource agent, or any aspect of the resource, resource agent, whether a sub-resource agent can be combined with other resources, whether a resource agent can be visible and/or detected to other resource agents, whether a sub-resource agent can participate in orchestrations or choreographies with other resource agent, or governance thereof can be associated with the sub-resource agent by a user. Resource agents are also associated with a real-time relationships with resources, rights-holders, and other resource agents; this is enabled by maintaining stateful communications between the resource agent and resources, rights-holders, and other resource agents. Statefulness ensures that changes in status, characteristics, or aspects of governance are maintained in real-time and not, for example, after an associated resource has been used. A registry service associated with each resource agent, which can act as an audit function, records changes in resource agent status, characteristics, or governance aspects as they occur.

Such capabilities of resource agents are made available through various functional services in the software model of the resource agents, including: Profile (providing identification and/or tombstone and/or profiling information for a resource agent); Link (facilitating rule-based linking to other resource agents and/or facilitating the creation of relationships between other resource agents); Find (facilitating search functions for other resource agents and/or facilitating search and discovery of other resource agents), Share (facilitating capabilities for sharing some or all aspects of a resource agent with other resource agents); List (facilitating a real-time tracking function of relationships, responses, and events that are associated with a resource agent); and Commerce (facilitating the commercial terms under which a resource agent may be accesses). As such, interconnected, real-time/session-oriented, organic, self-organizing, scale-free resource agents, comprising virtualized resources and networks thereof are made possible.

There is provided in one embodiment a resource management system comprising a computer-implemented platform running on at least one computing device, said platform for instantiating a plurality of interoperable resource agents, each resource agent being a user-defined representation of at least an aspect of a resource, wherein at least one aspect of governance of each said resource agent is distributable by a first rights holder to any at least one second rights holder; and a communications interface for interfacing said at least one computing device and at least one resource-related computing device, each resource-related computing device associated via said communications interface with at least one first resource agent in accordance with an access contract; wherein governance comprises the ability to authorize the further distribution of any one or more aspect of governance by the at least one second rights holder over at least an aspect of the resource agent over which the first user has governance.

Embodiments hereof comprise a resource management system which enables a resource user (which may be a resource owner or their delegate) to use, manage, and permit others to use and manage any resource, or an aspect, whether physical, informational, or otherwise, via a resource agent. The resources management system comprises a network of computing devices, each having access to a set of instructions enabling them to interact with one another, and to maintain in real-time a set of scripts and business processing documents for each of the resource agents indicating, inter alia, some or all of following information relating to a resource agent: addressing information (and/or information relating to or configured to be used in association with address resolution techniques), characteristics, relationships, interactions, status and governance. Since such characteristics, relationships, interactions, status and governance can be defined by a user (the resource agent rights holder), and each resource agent is instantiated on one of the network-enabled computing devices, the software provides for a set of user-defined resource agents, which are interoperable and can interact with other resource agents. The scripts and business process documents comprise information relating to the identity, profile and type of the resource (or aspect thereof) in respect of which the resource agent is representative, the relationships that exist or may be permitted between the resource agent and other resource agents, and the responses which are available and permitted. Each of these are implemented in accordance with a governance structure that permits the resource agent rights holder full freedom to establish rules and permissions associated with characteristics of the resources, who can use and interact with such resources, and what those uses and interactions may be. Such governance structure is instantiable and enforced through a normalized environment wherein each resource agent sets and enforces governance rules through a set of services (which may be embodied as a set of WSDL scripts), wherein logic associated with response permitted thereby is enacted in a set of associated BPEL documents and associated logic for each resource agent when there is linking of the resource agent with resources or other resource agents via the iConnector. The iConnector also supply the appropriate interfacing and communications protocols (and security/credentialing protocols and security safeguards) to permit the provision of the necessary arguments and functions to engage the BPEL documents and services.

Referring to FIG. 1, there is shown an overview of the component software-enabled and computer implemented architectures, and components thereof, associated with embodiments described herein. A resource platform domain 107 is a discrete domain controlled by the resource platform owner 100 or a designated individual, said resource platform owner not necessarily being a resource owner or creator 101, 102 (e.g. Facebook is the resource platform owner where an individual is the resource creator, but not owner since they create the page and have some level of control over some aspects of a Facebook page—and less governance control, if any—but the page and its governance is controlled by Facebook) and constitutes one or more communicatively coupled resources 105, 106, or resource-related computing devices which may relate to non-network-enabled resources. The resource platform may constitute, for example, interconnected resources (people, places or things; e.g. interconnected farm tractors, the tractors owned by the farmers but the interconnected communications medium controlled and operated by the tractor manufacturer). The resource platform owner 100 is in general the owner of a system where resources, or resource-related computing devices for non-network enabled resources, are hosted. The resource creator 102, 103 are the creators of the resource, although in some cases, they may be the owner of a resource in respect of which another entity, the resource platform owner 100, owns and controls a platform for monitoring and/or controlling the resource. The resources platform administrator 104 is the individual or entity charged by the resource platform owner 100 with the stewardship of the resource platform domain 107. The resource platform interface conditions 103 constitutes both (i) the conditions, as agreed upon between the resource creators 101, 102 and the resource platform owner 100, that govern the use of the resources 105, 106 by the resource creator 101, 102 while on the resource platform domain 107, and also (ii) the means of such interface, if any (e.g. a graphical user interface). The resources constitute any person, place or thing with a direct network interface, or in cases with an indirect network interface, it constitutes a device that manages information or data on behalf of the resource 105, 106 (and which may require syncing activities between the resource platform domain 107 and resource 105, 106 to maintain state).

The access contract 108 is the set of permissions, including governance controls, enabling full governance and control, as may be limited by the appropriate rights holder 113, 114 over the associated resource. The access contract 108 constitutes both (i) the set of conditions established between the resource platform domain 107 and the resource management platform domain 110, as may be limited or defined by the resource agent rights holder 113, allowing access to a resource 105, 106, and (ii) the means of interfacing and communicating between the resource platform domain 107, including the resource 105, 106, and the resource management platform 110, including the resource agent. The access contract 108 may be in part defined by the following (without limitation): access location and/or addressing information of the resource 105, 106 and the resource platform domain 107; the communications protocol for sending communications therebetween; and the interface protocol for establishing a connection therebetween. The access contract 108 also may include a shared access key or other credentials that enable authentication and access control by the resource platform domain. Example technologies for the access contract and authentication therewith include oAuth, OpenID, SAML. The access contract, when in a digital and/or computer-readable format, may be embodied as designated resource-specific access criteria.

The resource agent 115, 116, 117, 118 constitute computer-implemented instantiations or virtual representations of resources, said agents being in some embodiment one or more of the following: interoperable and autonomous. In general, each resource agent 115, 116, 117, 118 comprises of a description (including both a user-definable set of metadata, as well as corresponding user-definable data or characteristics), the applicable resource access contract 108, and the capabilities provided by resource management platform. Resource agent 115, 116, 117, 118 capabilities include but are not limited to the ability to the following: (i) Administer—Describing and declaring the resource type (person, place, thing), its creator assigned name and description; (ii) Authenticate—Declare the authentication method needed for access to the resource (which may utilize resource management platform functions to perform authentication functions); (iii) Access—Control access to the resource at the message protocol layer and interface layer, and customize access responses based on context; (iv) Audit—Access to all historical usage logs, real time use and transaction logs; (v) Automate—Develop automated orchestrations and choreographies, including sequencing and timing of actions and/or responses, in some cases pre-defined actions and/or responses; (vi) Aware—Publish resource agent details for discovery by other resource agents or rights holders therefor, and to control how, when and who can discover such resource agent; (vii) Availability—Control the availability of a resource to suit the needs of the owner, including the temporal (when) and characteristic (which part, aspect or service) availability, and the conditions of such availability (e.g. French-speaking services only and specific hourly rate); (viii) Analysis—Create alerts, dashboards, and reports and other events based on real time and historical logs; (ix) Activity—View the historical and real-time usage of an Agent; (x) Administer Users—Register new users and manage new ones in accordance with permissions and governance rules set by the rights holder of resource agent; (xi) Administer Policy Roles—Create access roles, consumer types and administrators for making available resources or aspects thereof to other rights holders and/or resource agents; (xii); Administer Semantics—Management of the name spaces and meaning of words for pursuant to the Administer functionality (i.e. (i) above); this capability may permit semantics to be related between domains through ontologies developed by rights holders, resource platform domain owners, resource creators, account owners, among others, and it may in embodiments also provides a mechanism for discovery of and correlations between resource agents.

Also shown in FIG. 1, is the agent domain 119, 120, 121, 122 which provides a discrete domain controlled by the agent account rights-holder 112, including or a designated individual or resource agent that has been granted control over the governance of a specific resource agent or aspect thereof. The account domain 111, 112 is the discrete domain controlled by a given rights-holder 113, 114 or their designates. Governance rights over this domain provides the ability to control all aspects of the resource agents contained in the account domain 111, 112. The resource management domain 110 is a discrete domain controlled by the resource management system administrator 109A or a designated entity. The resource management domain 110 is operated under the guidelines of the resource management system governance where rights holders have the liberty to conduct and associate with others without restriction and participate in the marketplace equally, subject to the governance distributed to them by the rights holder from which they may have inherited a resource agent. Governance of all resource agents, which not limited in quantum or degree, is subject to a behavioural code conduct that is governed by the community standards, and requires specific basic covenants under which the uRMS operates. These are not technical limitation, except insofar as they may be enforced by removal of rights to a rights holder, and comprise of the following: (i) Do no harm: harm to the network or individual participants in the network is not permitted; (ii) One Authentic Account per Person: only one account may exist for each individual participant in the network; (iii) security: resource management system security methodologies to ensure each individual user is protected from malicious intent of unauthorized users; and (iv) Individuals own their resource agent and all associated rights (including the rights to other resource agents owned by the individuals' resource agents). The rights holder 113, 114 is the entity authenticated by the resource management system as being either an individual with a user account within the resource management system or a resource agent; the rights-holder may refer to one of the following: an individual right-holder directly associated with a resource agent, or the individual rights-holder indirectly associated with a resource agent via one or more resource agents (i.e. a resource agent having 1 to n levels of inheritance between it and the original resource agent that is directly associated with an individual that is the rights-holder, where n is any positive integer greater than 1). The resource management system administrator 109A is an individual charged with the stewardship of the resource management system stakeholders 109. The resource management system stakeholders 109 is the owner of the resource management system.

In some embodiments, the distinction of the resource management system domain 110, wherein the governance over resource agents is both enabled and enforced, from the resource platform domain 107, wherein the resources are controlled, coupled with the direct access control via the access contract 108 from the resource agents 115, 116, 117, 118 to the resource 105, 106, provide a separation between the resources and the governance thereof; even in cases including closed networks of resources, provided the necessary control, communications, interfacing information is made available to the access contract 108.

Figure 2:
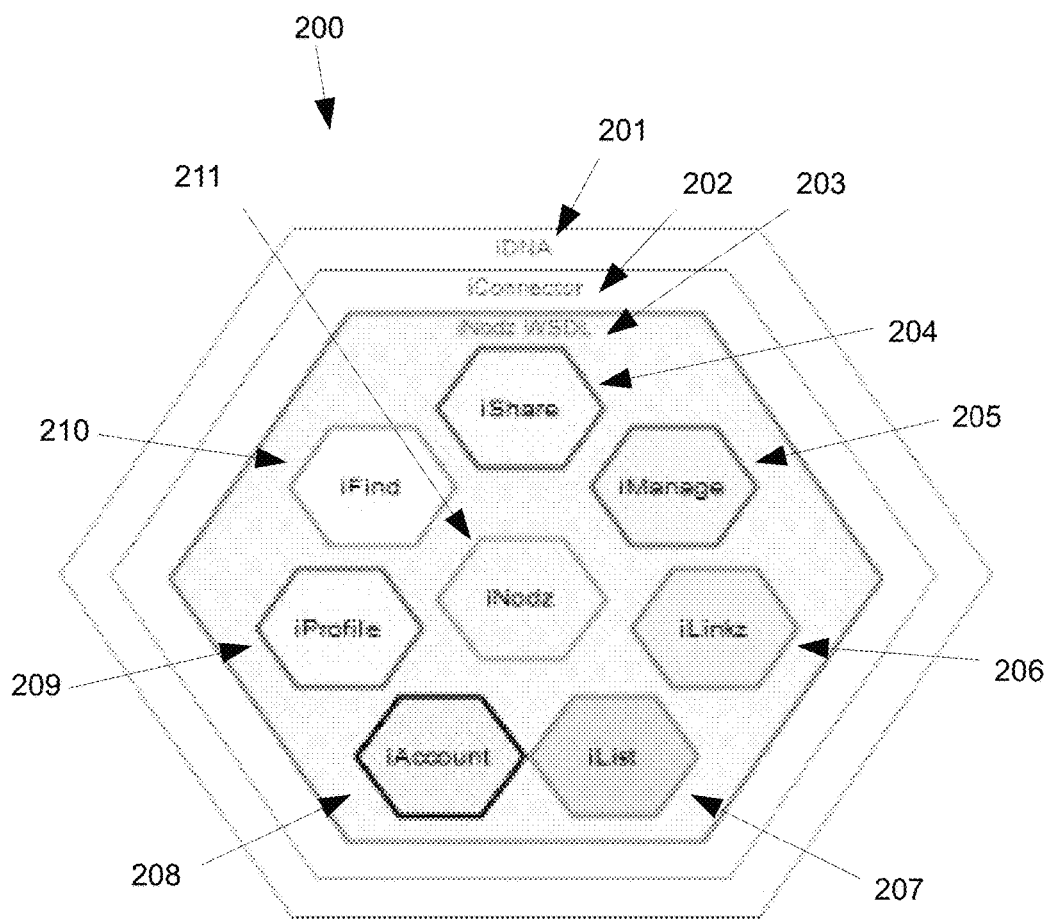
FIG. 2 is a diagrammatic representation of the architecture of a resource agent in accordance with one embodiment.

Referring to FIG. 2, there is shown the structure of a resource agent 200 and its constituent agent services and layers, which taken together provide the governance controls and functions for each resource agent. In some embodiments, each resource agent 200 is addressable by an agent domain namespace address layer 201, made up of an URL/URI, although addressing schemes in accordance with other protocols are possible. The agent connection layer 202 (sometimes referred to as iConnector) constitutes the description of the resource that the agent represents, communications protocol (including security protocols and access key), and the interface protocol used to access and/or interface with the resource agent (as may be required by the resource). The agent connection layer 202 constitutes the set of instructions, protocols, and related information that is used by rights-holders and resources to interact with resource agents 200. In some embodiments, each resource agent 200 utilizes a services distribution language layer 203; in an exemplary embodiment, the services distribution language layer 203 utilizes WSDL, but other services distribution languages known to persons skilled in the art may be used. In embodiments herein, the services distribution language layer 203 contains the registered resource agent's constituting information including its unique system name and namespace declarations for XML, WSDL Schemas, resource agent identification information, messaging protocols, user defined protocols, security protocols, user defined security protocols and services protocols. This assures the Agent is fully compliant with the resource management system operating environment and domain security. The services distribution language layer 203 provides a machine-readable description of how a service associated with a resource agent 200 can be called, what parameters it expects, and what data structures it returns. The services distribution language layer 203 may provide a language, protocol and schema for describing services as collections of network endpoints, or ports. For example, WSDL specification provides an XML format for documents for this purpose by using abstract definitions of ports and messages that are separated from their concrete use or instance, allowing the reuse of these definitions. A port associated with a given resource agent 200, which may be addressable based on information located in or through one or more of the iNodz service 211 and/or the agent domain namespace address layer 201 and/or the iConnector 201 of the is defined by associating a network address with a reusable binding, and a collection of ports defines a service. Messages may be abstract descriptions of the data being exchanged, and port types may be abstract collections of supported operations. The concrete protocol and data format specifications for a particular port type constitutes a reusable binding, wherein the operations and messages are then bound to a concrete network protocol and message format. In this way, WSDL (or other services distribution language) describes the public interface to the Web service. In some embodiments, WSDL may be used in combination with SOAP and an XML Schema to provide Web services over the Internet, thus making the resource management system platform 110 available to any computing device communicatively coupled to the Internet. A client program connecting to a resource agent service can read the WSDL file to determine what operations are available. Any special datatypes, which may be user-defined, used are embedded in the WSDL file in the form of XML Schema. The client (e.g. the rights-holder) can then use SOAP to call one of the operations and/or services listed in the WSDL file (using for example XML over HTTP).

In some embodiments, services distribution language layer 203, comprising WSDL, is used to ensure the following elements for association of any given resource agent to the core resource management system: XML Version, resource management system version, copyright notice, resource agent type description (user defined), XML/WSDL/Schema—Declarations, XML name space, WSDL name space, WSDL Extensions name space, iNodz name space, resource management system schema URL, message protocol declarations, SOAP name space, SOAP JMS name space, SOAP HTTP name space, XMPP iNODZ name space, other message protocol declarations (may be user defined), security protocol declarations, SAML name space, OpenID name space, other security protocol declarations (may be user defined), resource management system service declarations, inclusion of service iConnector information for core system functions (which may comprise a core resource agent providing inheritance from which all resource agents can derive some inheritance and connectivity) such as Core iNodz[D]Agent, Core Profile[ID]Agent, Core iLinkz[ID] Agent, Core Find[ID]Agent, Core Share[ID]Agent, and Core Manage[ID]Agent.

Within and via the WSDL layer 203, there are provided a number of service associated with each resource agent 200, which, in addition to making these services available via an Internet addressable location, provide for the distributable governance associated with the resource agent 200; in embodiments, a sub-resource can be instantiated by a rights-holder from every resource agent 200, wherein governance and permissions associated with the sub-resource is distributed to one or more other rights-holders by (or in accordance with authorization from) the rights-holder of the parent resource agent. These services (sometimes referred to as a service) include at least some or all of the following: (i) iNodz service 211: a service for maintaining all the tombstone information about the resource agent, including a Parent service to determine which parent service which created this resource agent 200, the date/time this resource agent 200 was created, the date/time this resource agent 200 was edited (specifically, the iNodz service may also, at the request of Profile service, (a) provide a service to create the SAWSDL script for a sub-resource agent based on the instructions from the current and in some embodiments one other resource agent and then write such script to a central registry and (b) retrieve all of the required resource agents which comprise or are related the current resource agent from the central registry and load them into the run-time environment); (ii) Account service 208: the account ID of the rights-holder of the resource agent (if the rights-holder is an individual), or in some embodiments of the rights-holder of the any parent resource agent(s) from which the resource agent 200 derives inheritance (where a resource agent is the rights-holder); (iii) Profile service 209: supports storage and/or determination and/or generation services for information relating to the name (the name of the resource agent 200 that the resource agent owner has defined, which in some cases is a natural language name of a resource agent), description (no default value for description and the owner can update this), and resource type (Person, Place, Thing— at time of creation Profiles may be defaulted to one type of resource, e.g Person, for which the owner or sufficiently authorized rights-holder can update), the resource access control standard (SAML, oAuth, OpenID) for credentialing and authorizing the resource agent 200 to interact with its corresponding resource, and a resource access key; (iv) iLinkz service 206: provides or contains (or makes accessible as a service via WSDL) the details of all of the relationships the resource agent has with other resource agents, including but not limited to service relationships (i.e. other resource agents providing a service to the resource agent 200), consumer relationships (i.e. other resource agents using services of the resource agent 200), and the BPEL document describing the resource agent's 200 relationship with the resource (e.g. resources 105, 106) and consumer relationships along with logic which supports the services iConnector 202 of the resource agent 200; (v) Find service 210: Provides resource agent-perspective discovery and correlation functions, tagging and semantics, and resource agent-perspective based search histories, and includes, taxonomies of resource agents (tags), resource agent interface data (semantics), and relationship history and correlations (find); (vi) Share service: Provides authorization and governance controls, such as identifying and current (and some cases, former) owners, assessing outbound and inbound access requests, invitations to access, blocking lists of non-permitted resource agents, publishing to catalogues (of existence and availability of the resource agent or aspect thereof, for example), user created share lists comprising other resource agents' IDs, user-defined rule-based sharing policies (permitting conditions associated with when, how and which other resource agents can view or access the services of the resource agent 200), suspended rule shares, and parent-child use controls (i.e. services of the resource agent 200 which remain available to parent agents and/or services of the sub-resource agents of the resource agent 200 which will remain available to the resource agent 200); (vii) Commerce services 207: Management of real time access lists, wherein such lists maintain state and update consumers (i.e. resource agents authorized to use services of the resource agent 200) in real-time, and include List management, creation, editing, and deleting services; (viii) Manage service 205: provides historical and real-time access logs and auditing capabilities, including historical transaction/access logs, real-time access views, event alarms, reporting, localization (e.g. assigning currency, country, zone (province/state/territory/region/jurisdiction), tax zone, tax type, tax rate, language, or other regional factors to resource agents), and usage fee information (e.g. setup fee, usage fee, usage type, subscription fee, subscription period, renewal periods, and other fee-related information, including how each may apply to other resource agents or classes thereof).

Figure 3:
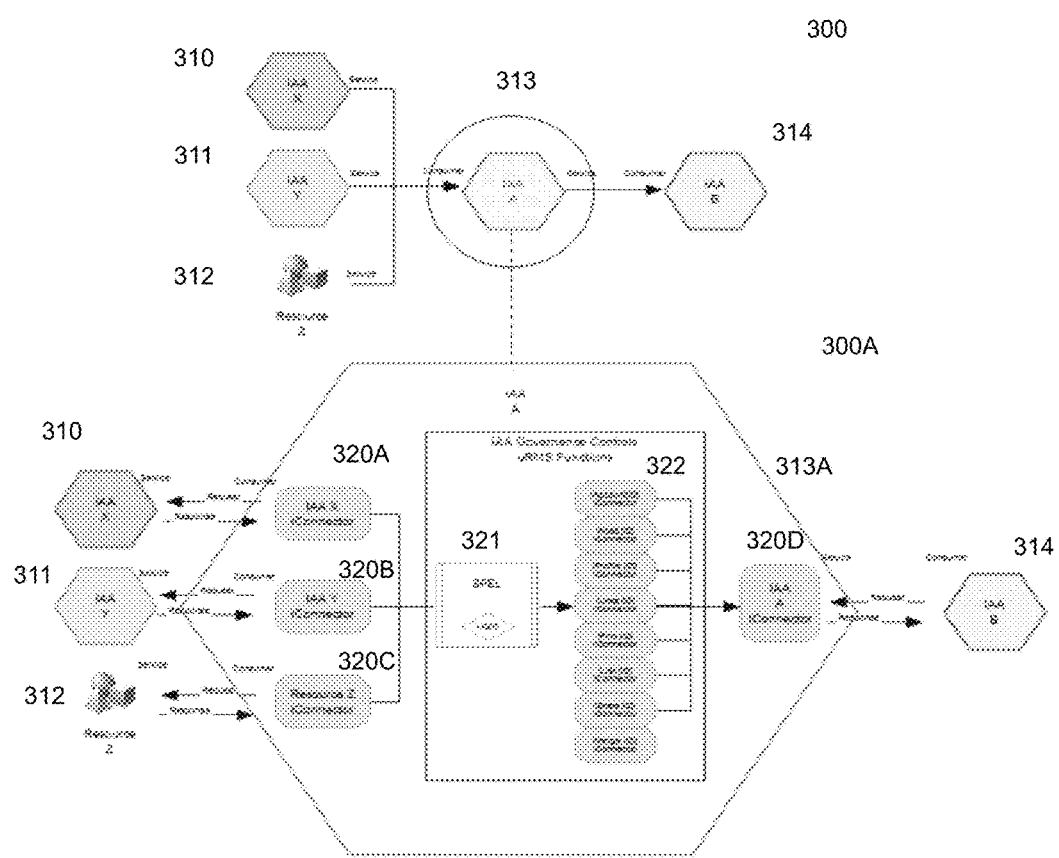
FIG. 3 is a diagrammatic representation of the response-request interoperability architecture of a resource agent in accordance with one embodiment.

Referring to FIG. 3, there is shown the open governance relationship-response model for resource agents in accordance with embodiments of resource management systems disclosed herein; shown are the overall relationship model 300 and with operational/functional details of the applicable response-relationship 300A. Resource agent 313 (and as shown with internal operational/functional details 313A) may act as a consumer resource agent relative to other resource agents 310, 311 and/or its applicable resource 312, or the resource agent 313 may act a service provider to other resource agents acting as consumer 314 of some services. Every relationship between resource agents and between resource agents and resources is characterized by a service/consumer relationship. In addition, interactions between each related resource agent pair or resource agent/resource pair is characterized by a request/response set of communications, wherein respective iConnectors 320A, 320B, 320C, 320D associated with each related entity 310, 311, 312, 314 provides the connection means (i.e. interfacing and communications protocols plus, in the case of a resource agent/resource pair, an access contract) and facilitates communication. Each service 322, embodied as WSDL scripts associated with the resource agent 300/300A and located at the resource agent address domain, uses logic set forth in BPEL documents 321 to enable the interaction of other entities with the services as either service providers (in this case resource agents 310 and 311 and resource 312) or consumers (resource agent 314). For example, specific activities and functions of an associated resource can be programmed in a BPEL document, and it may be carried out in accordance with governance rules as determined by the services.

Figure 4:
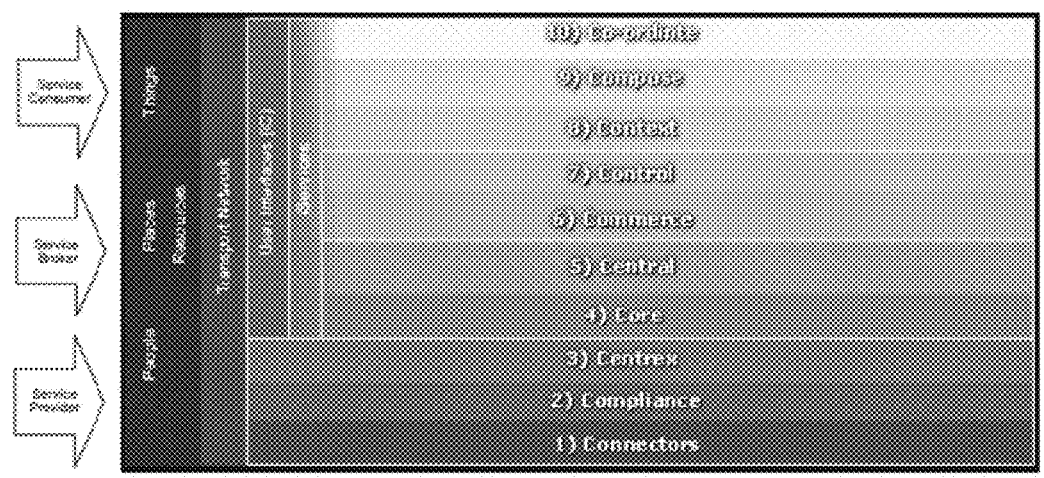
FIG. 4 is a diagrammatic representation of the service oriented architecture of a resource management system in accordance with one embodiment.
Figure 5:
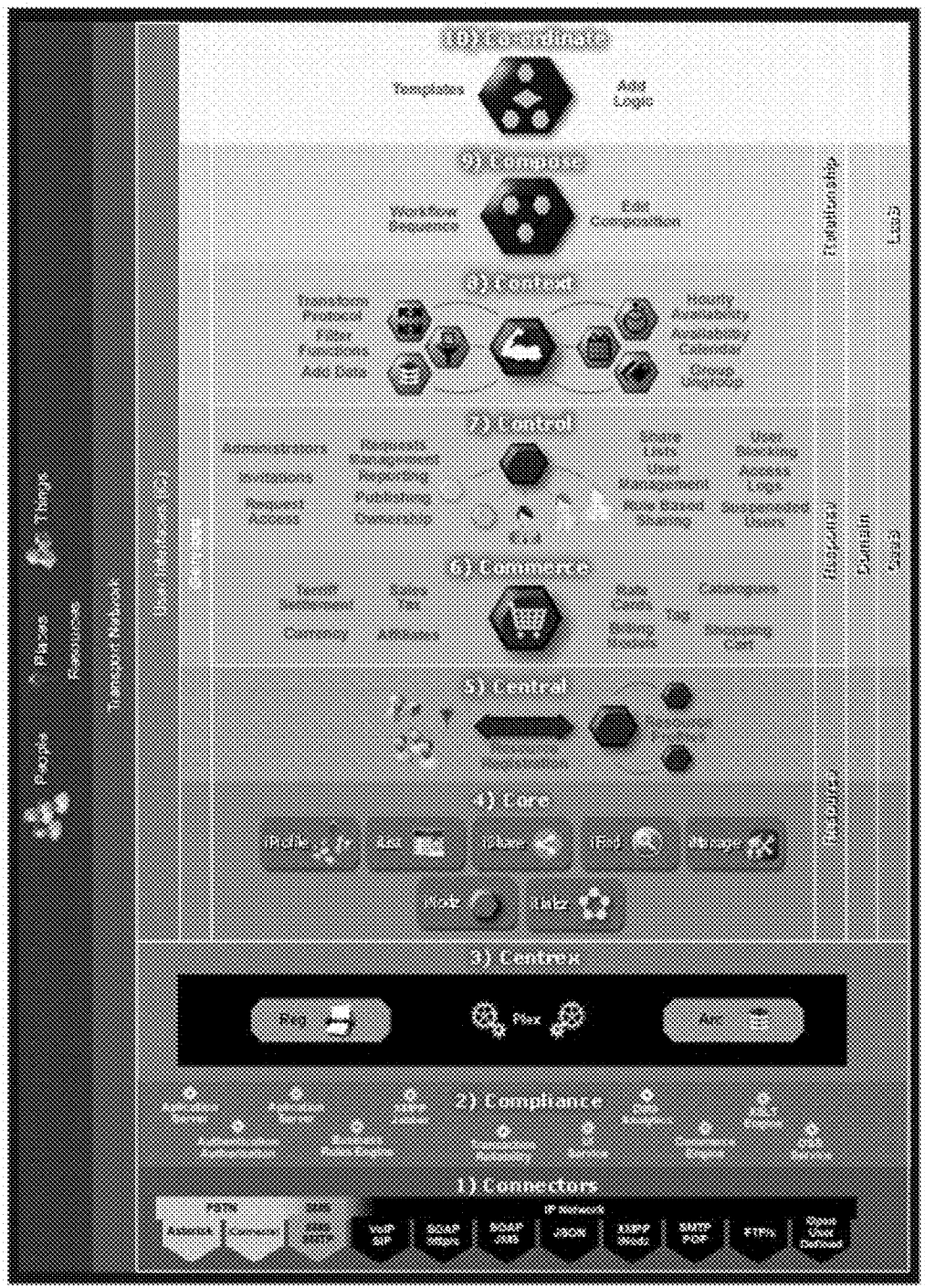
FIG. 5 is a diagrammatic representation of another service oriented architecture of a resource management system in accordance with one embodiment.

Referring to FIGS. 4 and 5, there is provided an overview of the Service Oriented Architecture of the resource management system. The purpose of the resource management systems disclosed herein is to provide increased resource utilization and thus value creation. Embodiments of the resource management systems disclosed herein achieve this by providing a normalized resource marketplace where owners control the resource agents that represent their resources. They are able to modify the service responses and control the relationships that are formed with their agents by other resource agents. Embodiments of the resource management systems (which may be referred to herein as the "uRMS") disclosed herein are implemented using a Service Oriented Architecture (SOA) which provides an advanced architecture for delivering web services via the Internet. Embodiments of the SOA developed for resource management systems of the instant disclosure are configured to manage interoperable and autonomous resource agents. This uRMS-specific SOA is de-signed to facilitate the uRMS agent object model which governs the behavior of the resource agents. uRMS exposes layers of the SOA through discrete controls via Core services that are attached to each registered resource agent through the uRMS WSDL schema. The uRMS platform domain also provides additional services that allows users the ability to access other layers of the uRMS architecture. uRMS provides third party service provides a method of providing their services to the uRMS platform domain eMarketplace, via the communications interface. A service can be enabled as a service and provided for use by the users of uRMS through the services API and in accordance with the governance as established and/or distributed to the owner and/or rights holders of resource agents. In FIG. 4 there is shown the various hierarchies relating to resources, network services, and the service stack functions associated with the uRMS SOA. These include service stack functions that are directly associated with a communication transport layer (or other network communications layer below the application-layer): connectors, compliance functions, and the central control server module; control mechanisms associated with presentation and application-layer functions, including all resource-agent service stack functions: core services, central control server communications, commerce setting, control setting, context enabling functions, event/response composing functions (e.g. orchestrations), and coordinating functions (e.g. choreographed interactions).

FIG. 5 shows additional details in respect of the 10 service stack functions. The connector layers shows the various supported network protocols: PSTN (asterisk, iConnectel), SMS (SMS SMTP), and IP (VOIP/SIP, SOAP http/s, SOAP JMS, JSON, XMPP, SMTP/POP, FTP/s, and open user-defined protocols). Other user-defined or user-supplied protocols, including proprietary protocols, which may be carried as SDU (e.g. frame, packet or segment payload used in conjunction with interfacing or communications protocol at application-layer or end-to-end or transport- or session-layers) with respect to any standard or known PDU (e.g. frame, packet or segment). The compliance layer ensures compliance, support and quality management for network communications; for example, it may comprise of any the non-limiting illustrative features, application server rules, authentication/authorization/credentialing, business rules engine, XMPP/jabber server, transaction reliability and quality of service rules, UI service, data analytics, commerce engine (e.g. fees and fee rules), XSLT engine, and OSS service (operations support system).

The next layer shown in FIG. 5 is the centrex, which is the name used in some embodiments to refer to the central administrative server (although it may be run on or across one or more servers). The functionality of the centrex is (1) the registry service, which registers all information, scripts, and documents relating to each of the resource agents (as well as related information, such as interoperability information for the iConnectors, interfacing and communications protocol information); (2) the run-time environment for running logic (as for example made available by BPEL), processing requests and responses between resource agent in accordance with the associated business rules and applicable governance, enforcing other rules and governance, and implementing all other application-layer functions, methods and events arising by and between resource agents (such as relationships, resource agent searches, orchestration and choreography); and (3) the archive in which all requests, responses, and events are tracked in real-time as they occur based on processing in the run-time environment.

In embodiments, the preceding levels of the service stack refer to those that apply directly to network communications layers below the application-layer (from end-to-end to other networking and link layers of networking). The remaining levels of the service stack shown in FIG. 5 is the core services, which represent the governance services associated, via WSDL scripts, with each resource agent. The commerce layer services permit a variety of commerce-related aspects to be associated with resource agents and/or associated responses and events, including fees, currency, tariffs, sales tax, affiliates, rate cards, billing models, catalogues and shopping carts. The control layer dictates how a resource agent may interact with other entities (including rights-holders/owners, resources, and other resource agents) depending on the profiles of such entities (owner, delegated rights-holder, administrator), permitted and blocked users (through lists), access logs and audit trails, user management, rules-based sharing, request management, and reporting, publishing and ownership. The next layers may dictate the interaction with other entities. The context layer permits grouping, availability (and other authorization limitations), grouping/ungrouping with other resource agents, among other functions. The compose layer permits orchestration in which a workflow sequence may be defined (possibly in response to a specific request from a specific related entity), and such sequences can be defined and edited. The co-ordinate layer permits choreography, wherein various grouped resource agents may interact in accordance with predetermined set of rules and/or sequences based on, in part, the actions of other resource agents associated with the choreography.

Figure 6:
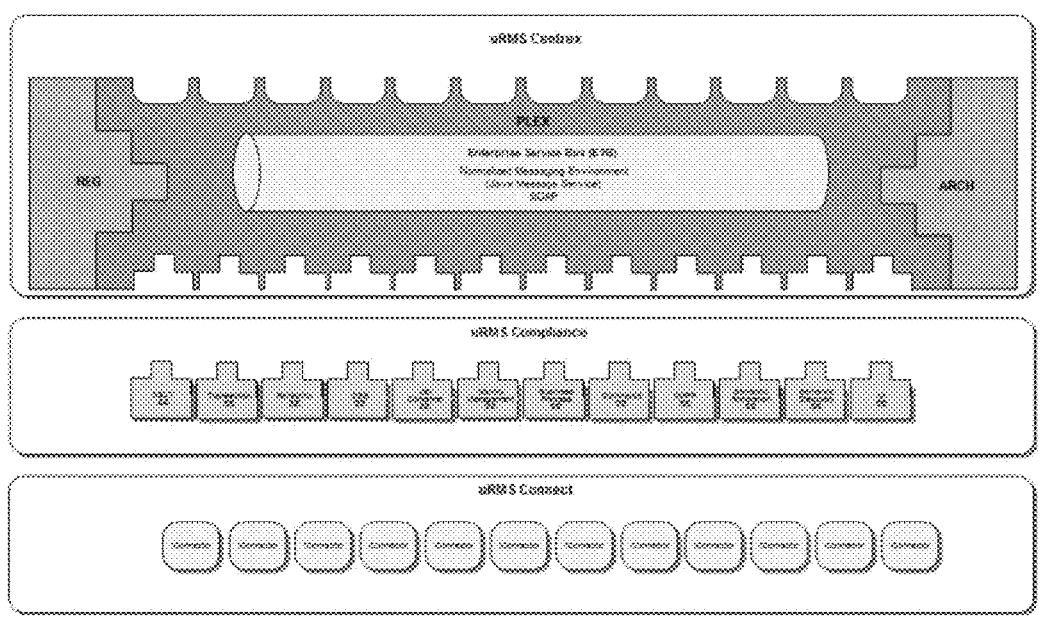
FIG. 6 is a diagrammatic representation of a centralized administrative service of a resource management system in accordance with one embodiment.

Referring to FIG. 6, there is shown the Centrex layer, which provides all the event handling capabilities needed to find, execute and communicate between different resource agents, and also between resource agents and the resources they represent. When a service request is received addressed to a resource agent, the Centrex instantiates the services necessary based on an Agent's WSDL. Centrex is made up of: the PLEX, or the runtime environment; the REG, or the services directory; and the ARCH, or the transactions data store.

The PLEX comprises an open source Enterprise Service Bus (ESB) which monitors and controls the routing of message exchanged between resource agents and resources. The PLEX ESB operates using a normalized messaging environment based on Java Message Service (JMS) and SOAP providing tight integration to the resource agent services and iConnectors. The PLEX acts as an intermediary for routing messages between the respective resource service endpoints via their corresponding iConnectors allowing endpoints with differing messaging standards the ability to communicate. The functions of the PLEX include: (a) invocation: Locates and invokes iConnectors to support synchronous and asynchronous transport protocols; (b) Messaging: Performs message-processing, message transformation and message enhancement; including to processes and convert various message exchange patterns (synchronous request/response, asynchronous re-quest/response, send-and-forget, publish/subscribe), provides queuing and functional holding of messages if applications temporarily become unavailable or work at different speeds; and provide for the splitting and combining of multiple messages and the handling of exceptions; (c) Management: Provides Java Management Extensions (JMX) for monitoring, audit, logging, metering, admin console, supporting real-time business activity management (BAM), as well as connects to OSS SE; (d) Mediation: Invokes differing iConnectors for protocol transformation, service mapping; (e) iDNA: Static/deterministic/URL/URI routing; (f) iConnectors: Supports the use of customized iConnectors for supporting integration with heterogeneous resources and system; (g) Service Engines: Supports core integration to the ESB container allowing for optimized integration and independent scalability; (h) Validation: Compliance interface provides for validation against resource agent WSDL schemas and standards for sending and receiving messages; and (i) JMS Integration: The ESB container provides for the close integration of the enterprise-class application platforms via JMS.

Figure 7:
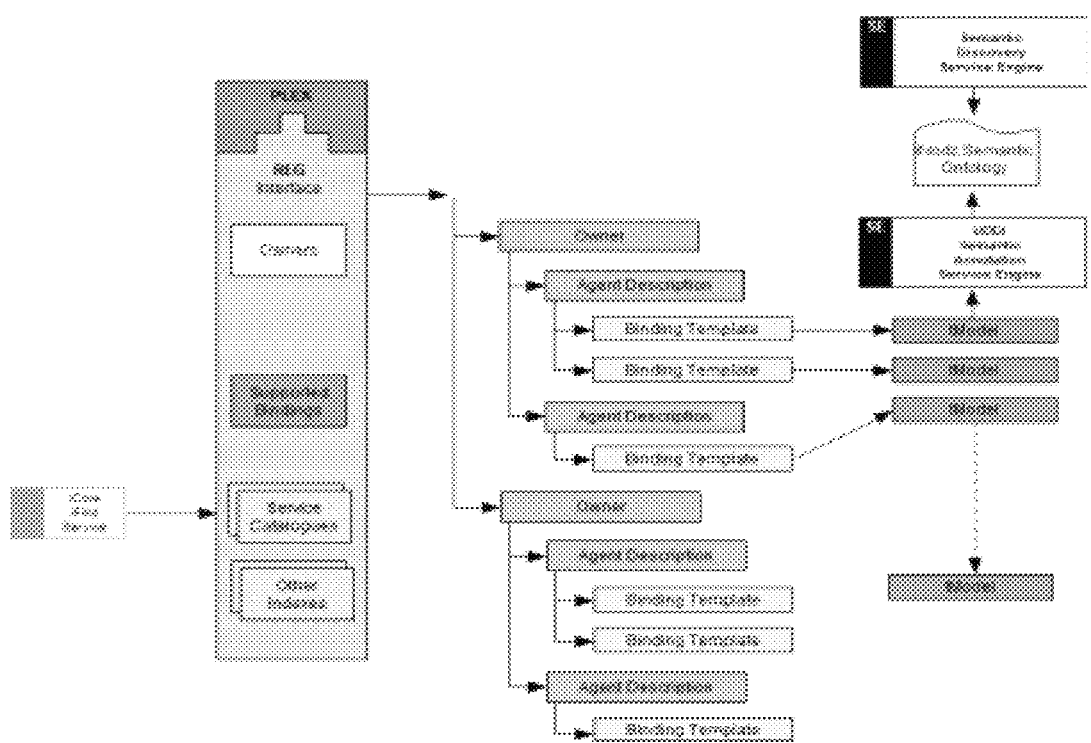
FIG. 7 is a diagrammatic representation of a resource agent management system registry, and its relationship to resource agents and users, in accordance with one embodiment.

Referring to FIG. 7, there is shown a diagrammatic representation of the REG, which constitutes a registry of resource agent information, including all WSDL documents that comprise identity, profile, ownership, relationship, response and governance information relating to resource agents. Within the REG is listed ownership and rights-holder information associated with a given resource agent, as well as supported bindings (which provide for interoperability engines), as well as model for structuring ownership/rights with associated resource agent descriptions and binding templates. Such templates from implementing business process logic and rules.

The Centrex Arch groups all data storage functions of the uRMS for all transactions (i.e. requests and responses) and events; these include Service Engines, Core services and Nodz services. In embodiments, the Centrex Arch utilizes an industry standard MySQL Cloud Database which is a drop-in database-as-a-service for MySQL-based services. (Example: Amazon (Amazon RDS)). Distribution, availability, elasticity, backup, throughput and maintenance may be provided as third party providers. OSS monitoring is maintained by compliance-layer operations over all third party data services. For metadata and non-relations database data, like native file system for example, the uRMS may utilize a Hadoop deployment via a third party provider like Hadoop on Amazon EC2 and SimpleDB. As such, deployment by the Arch to Hadoop storage systems and implementation of HDFS for data analysis is disclosed.

Figure 8:
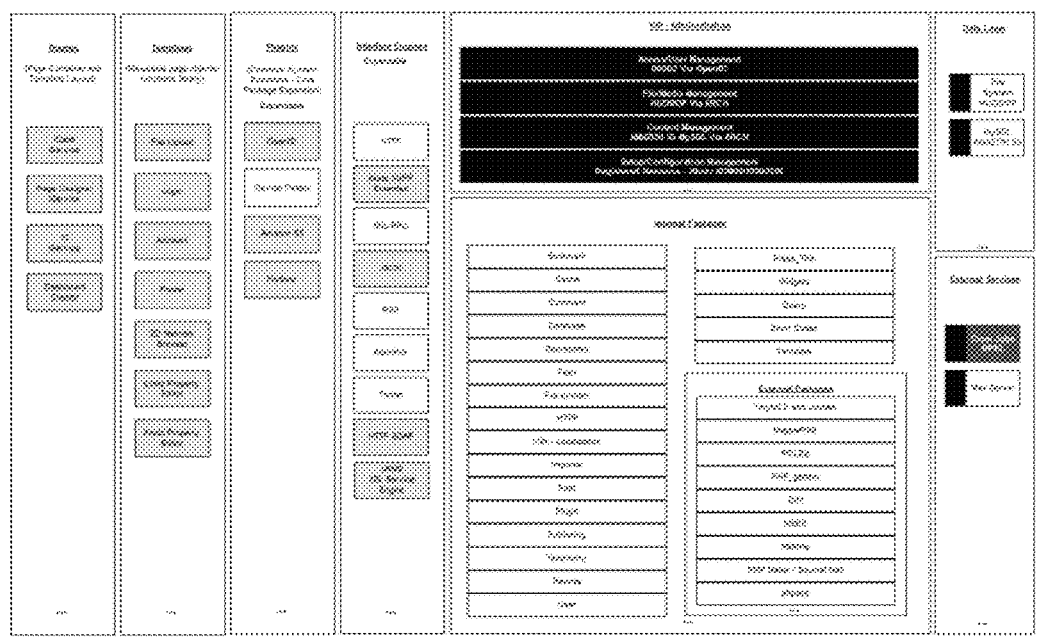
FIG. 8 is a diagrammatic representation the user interface architecture for interfacing the resource management system in accordance with one embodiment.
Figure 9:
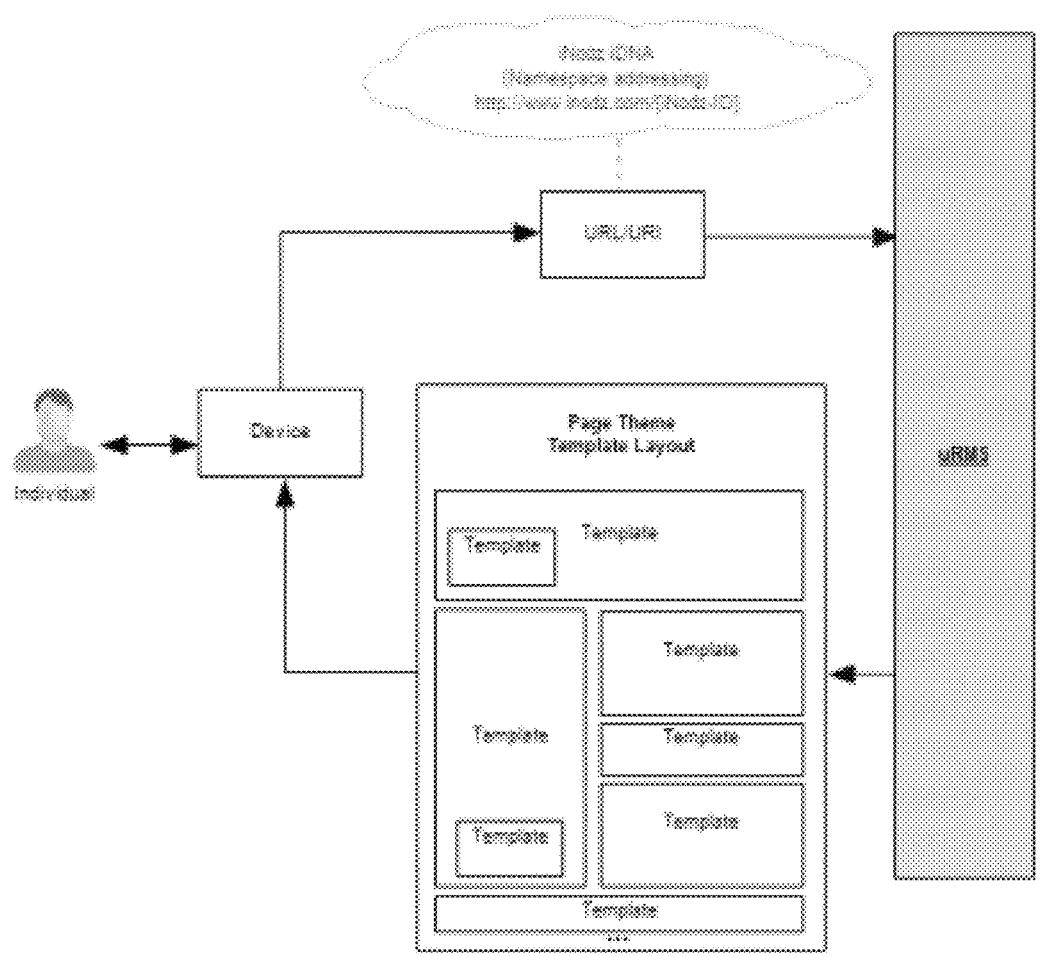
FIG. 9 is a diagrammatic representation of the process flow relating to user access/interfacing with the resource management system in accordance with one embodiment.

Referring to FIG. 8, there is shown the user interface architecture for interfacing the resource management system. Themes are disclosed at a first layer, including page designer iService (iNodz specific service manager and/or designer), iConnector UI services, and a dashboard creator. Templates are supported at another layer, including reusable page objects and functions such as, but not limited to, file upload, login, account services, footer services, 3D network browser, an iLinkz property editor, and a resource agent property editor. Plugins for third party applications to interface with the system (including the stored data) are provided at another layer, such as OpenID, Device Detect, Amazon S3, and Hadoop. Next the Interface Engines layer provides functionality for interfacing and communication in accordance with HTTP, XMPP, XML-RPC, JSON, RSS, AtomPub, Twitter, HTTP SOAP, uRMS XSL Service Engine. The Interface Engine layer is extendable in that protocols and interfacing language may be extended by adding user-supplied third party protocols. Other administration and internal packages are made available for interfacing. Also supported is direct data layer interfacing (by, for example, HDFS, MySQL, and other data-oriented file systems and data analysis and data management tools and applications). External services can also access the system for use in such applications as mail servers or other application-layer interfacing. Referring to FIG. 9, a diagrammatic representation of the process flow relating to user access/interfacing with the resource management system (uRMS) is shown. An individual user accesses the uRMS via a device, and information is returned therefrom in accordance with a template associated with specific information, which is then displayed on the accessing device. The template may be developed, and have distributable governance associated therewith.

In accordance with an embodiment disclosed herein, there is provided a communications interface for interfacing one or more resource-related computing devices with a computer-implemented platform of interoperable resource agents, each said resource agent being a computer-implemented representation of a resource and being configured to manage in accordance with an access contract at least one aspect of said resource, the interface comprising: at least one network interfaceable switching component having access to said computer-implemented platform, said switching component configured to accept an interoperability information associated with a communications protocol from a first resource user, said interoperability information configured to enable communications to the platform by at least one resource-related computing device that communicates in accordance with said communications protocol; wherein at least one aspect of governance of said interoperability information is distributable by a first user to any at least one second user, wherein governance comprises the ability to authorize the further distribution of any one or more aspect of governance by the at least one second user over an aspect of the interoperability information over which the first user has governance.

Figure 10:
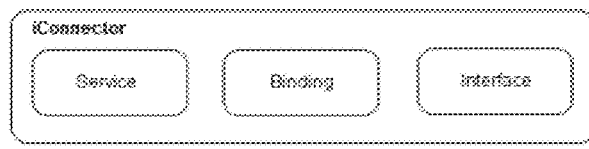
FIG. 10 is a diagrammatic representation of a structural format of an interface element in accordance with one embodiment.
Figure 11:
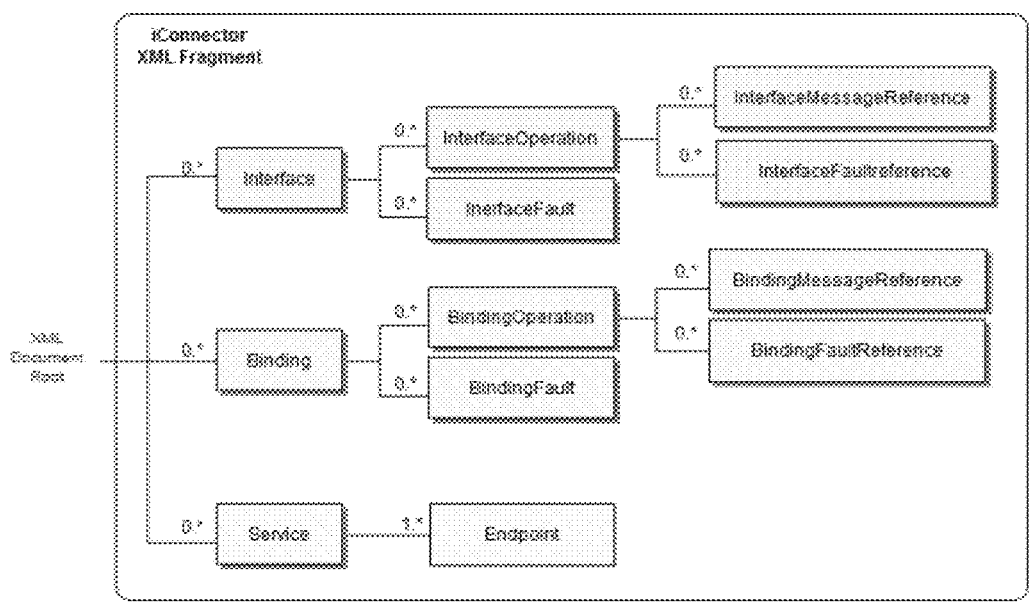
FIG. 11 is a diagrammatic representation of a structural format of another interface element in accordance with one embodiment.

In some embodiments, the interoperability information comprises some or all of the resource addressing information, resource agent service address, communications protocol (including security protocols and access key), and the interface protocol used to access and/or interface with the resource agent (as may be required by the resource), which may comprise in part the information required by the iConnector. The iConnector may comprise a user-defined Java Business Integration (JBI) unit for interfacing a Binding Component (BC) associated with the resource management system communications interface. The iConnector may comprise in some embodiments a plug-in component within the Java Business Integration (JBI) runtime environment. In some embodiments, the JBI runtime environment may also be the foundation of the Centrex Layer of the uRMS. Java Business Integration (JBI) is an implementation of the JSR 208 specification, and has been developed as a way to implement a service-oriented architecture (SOA). JBI defines an environment that offers plug-in components which interact using a services model based directly on Web Services Description Language (WSDL). The iConnector is generally user-definable and configurable via a user interface offered as part of the process of registering a resource defining or configuring a resource agent. In contrast, BC's are not exposed to end users and are typically pre-assigned by service developers in an SOA for specific iConnectors or classes of iConnectors. FIG. 10 shows the specific structural format of an iConnector expressed as XML within the WSDL Document; the structural format comprises a Service, Binding, and Interface. The service element describes where the service can be accessed on the network. The binding element describes how the web service is accessed over the network. The interface element describes what operations the web service has, and what messages are exchanged for each operation (input/output), and also describes possible fault messages. FIG. 11 shows the XML structure of an iConnector in further detail. In general, WSDL does not explicitly provide mechanisms to specify the semantics of a resource's interface operations, but it does specifies the format and structure. To create a common set of semantics, the uRMS uses Semantic Annotations for WSDL and XML Schema (SAWSDL). This defines mechanisms by which semantic annotations can be added to WSDL interface operations associated with resource agents. A resource agent within the uRMS may be described using Semantic Annotations for WSDL (SAWSDL), a WC3 recommend standard. While the syntactic descriptions provide information about the structure of input and output messages of interface operations and about how to invoke the resource, semantics are also needed to describe what the resource agent, as a web service or a set of web services, actual does. These semantics, when expressed in formal languages, disambiguate the description of web services interfaces, facilitating automatic discovery, composition and integration of software components which enables simplified interoperability. This allows for the creation of a resource agent-level ontology which can then be related to other resource agents or rolled up to a user level ontology and to a system-wide resource agent ontology. At each level, semantic based services can provide unique capabilities. Through compatibility of ontology, by virtue of utilizing the XML-based WSDL scripts located at address locations associated with each resource agent resource agents, user-defined semantics can be generated that can be interoperable and/or render the resource agents interoperable. In some embodiments, the interoperability of said resource agent may be associated with governance permissions, which are distributable by a rights holder (either the creator, which means such rights holder has full governance rights, or a subsequent rights holder, who may distribute as much governance as they have been granted, provide they have been granted distribution rights). Other similar types of protocols, languages, mark-up languages, and distribution languages may be used in accordance with embodiments hereof, provided that the semantics used to define resource characteristics in or of a resource agent can be user-defined and/or capable of interoperability with other resource agents (at the rights holders discretion or otherwise).

Figure 12:
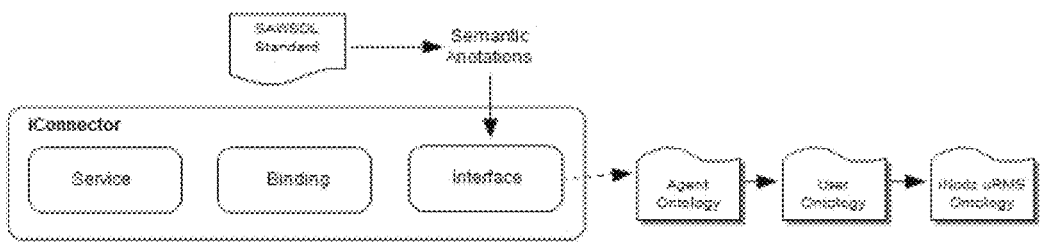
FIG. 12 is a diagrammatic representation of a structural format of another interface element in accordance with one embodiment.

FIG. 12 shows how an SAWSDL can be contributed to by using user-defined semantic annotations, to develop a web services delivery language interface that is based on a resource agent-specific (or agent class-specific) ontology, a user-/owner-/rights-holder-specific ontology, and/or a system-wide ontology. For example, the uRMS system may specify that all resource interface operations be semantically annotated. To facilitate this, some embodiments of the uRMS use the Fusion Semantic Registry as an extension to the UDDI registry. In such embodiments, as resources are added to the REG registry, the uRMS ontology will grow. Fusion Semantic Registry is based on a reference ontology which combines the use of SAWSDL for creating semantically annotated service interface descriptions and the use of OWL-DL for modelling service capabilities and for performing matchmaking via DL reasoning. The Fusion Semantic Registry Ontology defines the function annotations needed to define functional semantic profile of a registered resource agent, which may include data structures, functional categorization and behavior tracking and archiving.

Figure 13:
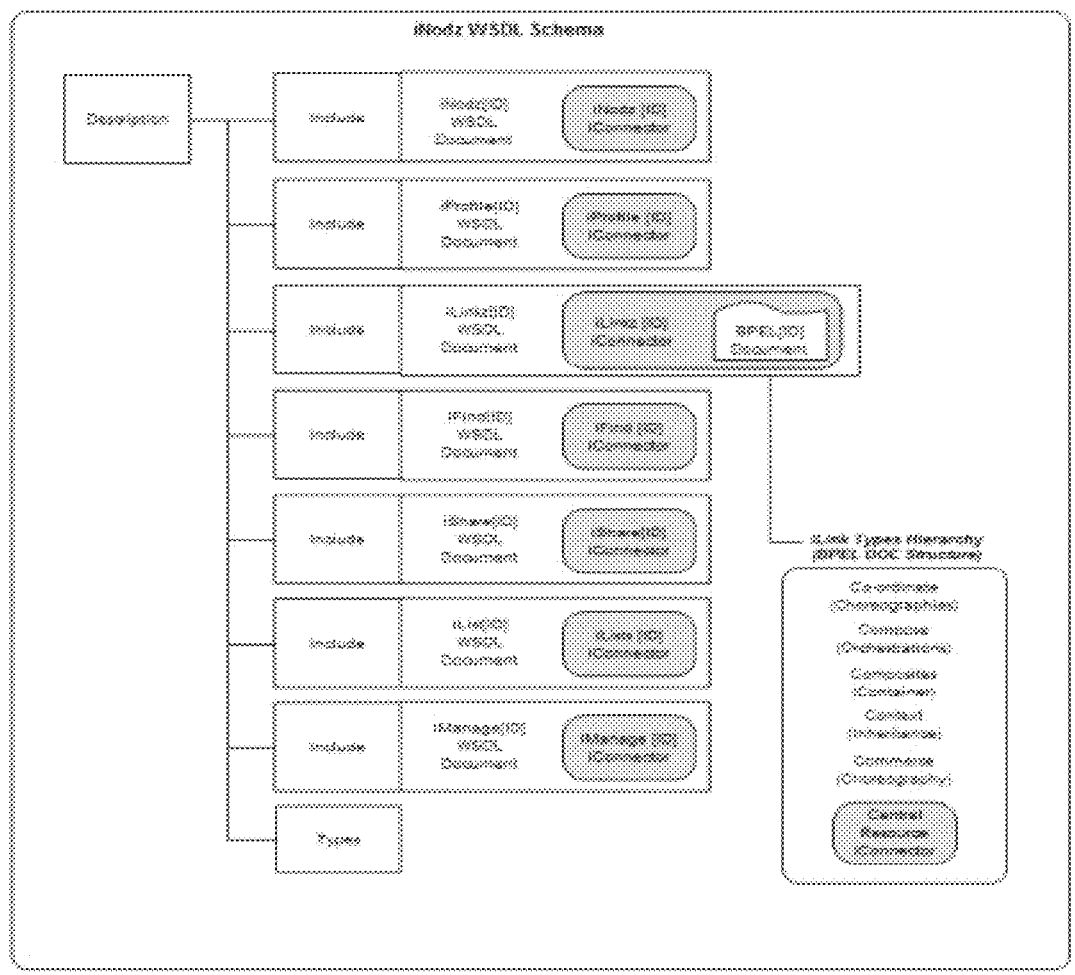
FIG. 13 is a diagrammatic representation of an interface element and the interoperability information in accordance with one embodiment.
Figure 14:
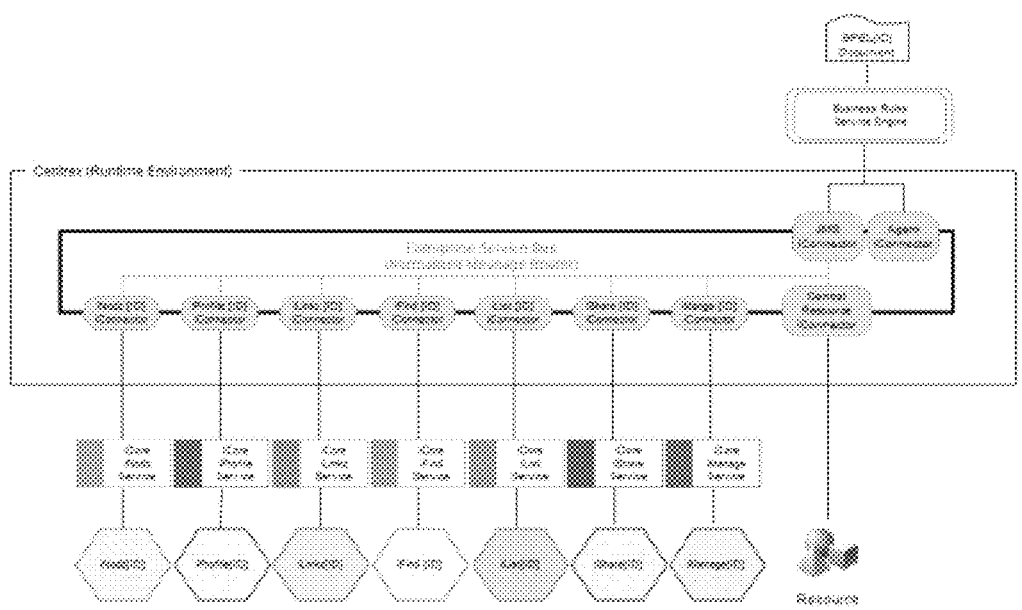
FIG. 14 is a diagrammatic representation of one interfacing element operation in accordance with one embodiment.

FIG. 13 is a diagrammatic representation of how the iConnector, using the interoperability information specifically associates with each service of a resource agent, where the services provide the governance control (including the distributability thereof). The iLinkz service, which is used to determine how, when, and who can form associations service provider or consumer relationships with a given resource agent, is further associated with a BPEL document. The BPEL document, in association with a business rules engine, can implement various functionalities, including coordination with other resource agents (choreography), request/response composing (orchestrations), composites (containers), context (inheritance and authorization limitations via inheritance), and commerce functions. These may be further enhanced by the iConnector providing the communications interface with corresponding resources, in accordance with an access contract and the specific interoperability information associated with the specific resource or class of resources. FIG. 14 is a further diagrammatic representation of the iConnector operation, showing respective service iConnectors associated with each of the services of the applicable resource agent. Also shown is the relationship between the BPEL document associated with the iConnector and/or resource agent via a business rules engine. Lastly, the corresponding resource is connected to a resource agent via a resource iConnector. All such connection takes place within the PLEX (i.e. the centrex run-time environment) through an enterprise bus service providing a normalized message router.

Figure 15:
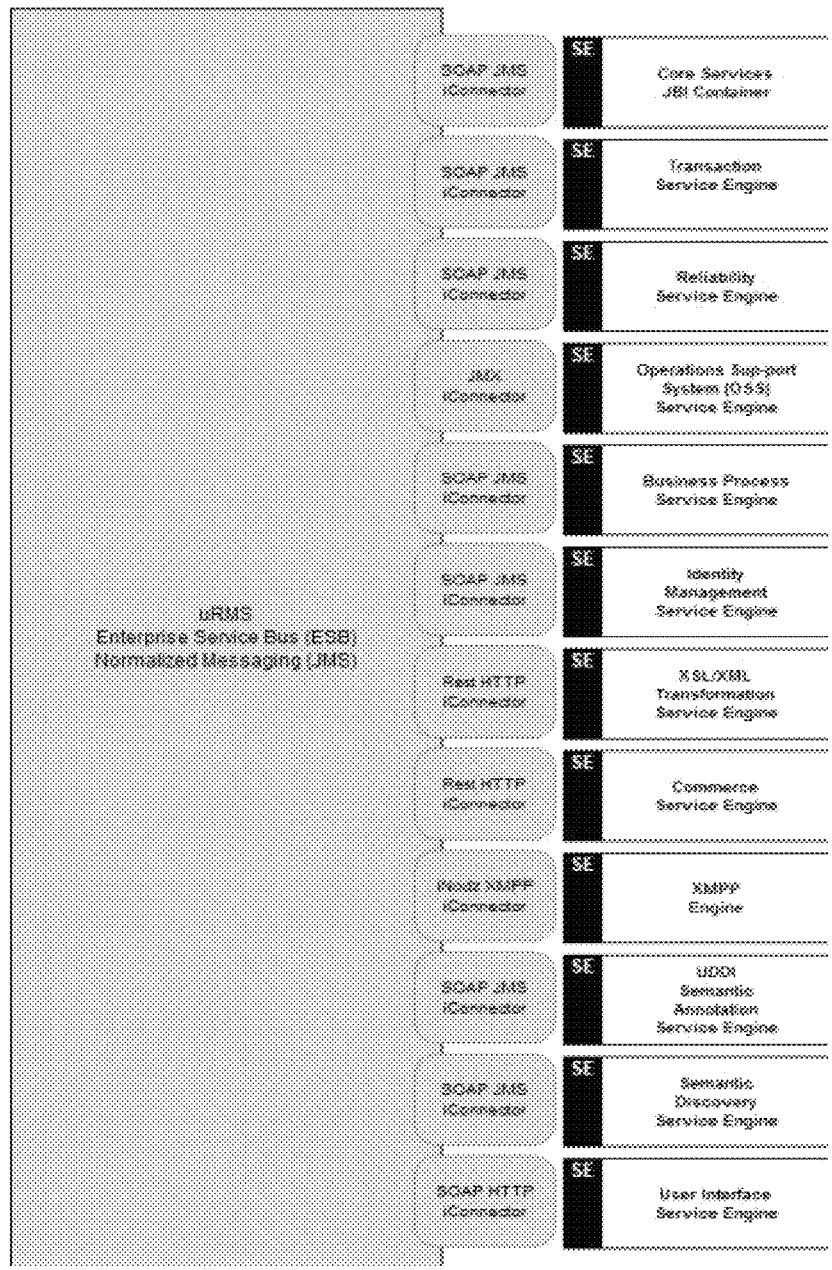
FIG. 15 is a diagrammatic representation of an service bus and service engines associated therewith in accordance with one embodiment.

FIG. 15 shows the relationship between the uRMS enterprise service bus and service engines associated with the resource agent and/or uRMS operations. Service Engines utilize iConnectors to connect to the Enterprise Service Bus (ESB). Service engines send and receive messages to and from the ESB and message within the iNodz Domain exclusively. Their general function is to support the Core services and the operations of the uRMS. Each Service Engine may scale independently. The following core services are provided in some embodiments: (i) Core Services JBI Container: Application platform (Glassfish v3) for running J2EE services, which independently scales and maintains optimized native messaging within the ESB; (ii) Transaction Service Engine (BPEL Transaction Management): Coordination framework for distributed services supporting WS-Coordination 1.2, WS-AtomicTransactions 1.2 and WS-BusinessActivity 1.2 protocol operations, and ensures that all operations within the resource agent transaction boundary succeed or fail in a consistent manner; (iii) Reliability Service Engine (BPEL Reliability Management): Handling of component, system, or network failures between uRMS and resources, and supports WS-ReliableMessaging 1.2 protocol operations; (iv) Operations Support System (OSS) Service Engine: Nagios JMX open source tools kit for monitoring, audit, logging and metering software, hardware and infrastructure using standards and off the shelf plugins; (v) Business Process Service Engine (Processing BPEL): The Business Process (BPEL) Service Engine provides run-time services for deploying BPEL processes, and is used to execute WS-BPEL 2; (vi) Identity Management Service Engine (Authentication): provides authentication framework for authentication, account, agent, session, policy and logging; (vii) XSLT—XSL/XML Transformation Service Engine (Transformation XML Documents): Facilitates the transformation of data formats and values, including transformation services via xslt or xQuery without altering the resource within the ESB; (viii) Commerce Service Engine (Financial Transactions Agent and Commerce iLinkz service): provides enabling commerce services; (ix) XMPP Service Engine (List Management): XMPP standard message processing and real-time roaster management for managing Lists via the rosters within Jabber; (x) UDDI Semantic Annotation Service Engine (Semantics Publishing and Discovery): SAWSDL processing to UDDI, and generates domain based ontologies for use in discovery; (xi) Semantic Discovery Service Engine (Semantic Web Crawling): Semantic indexing RDF Linked Data, and creates RDF links from resource agent Domain to external data sources on the Web; and (xii) User Interface Service Engine (iC iNodz Interface, Interface Designer, UI Object Management): The User Interface Service Engine provides individuals access to resource agents and resource management system interfaces, as well as management framework for creating and managing interfaces.

Figure 16:
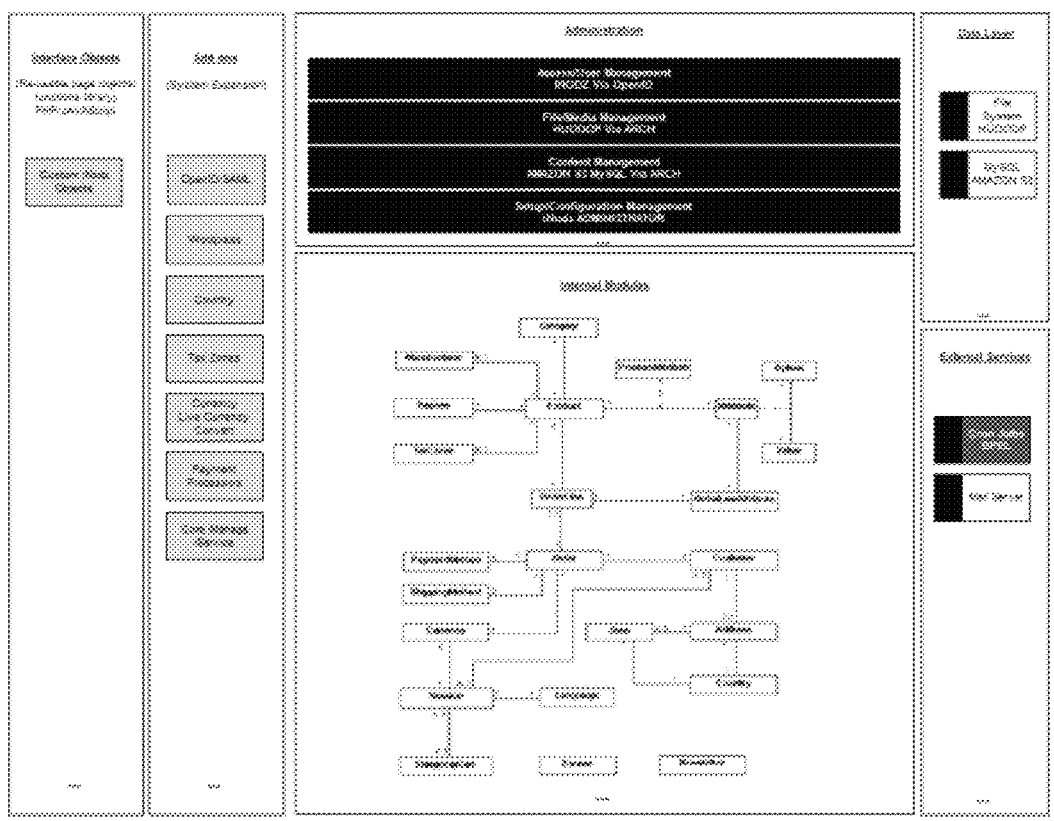
FIG. 16 is a diagrammatic representation of a software-based commerce-related service engine in accordance with one embodiment.
Figure 17:
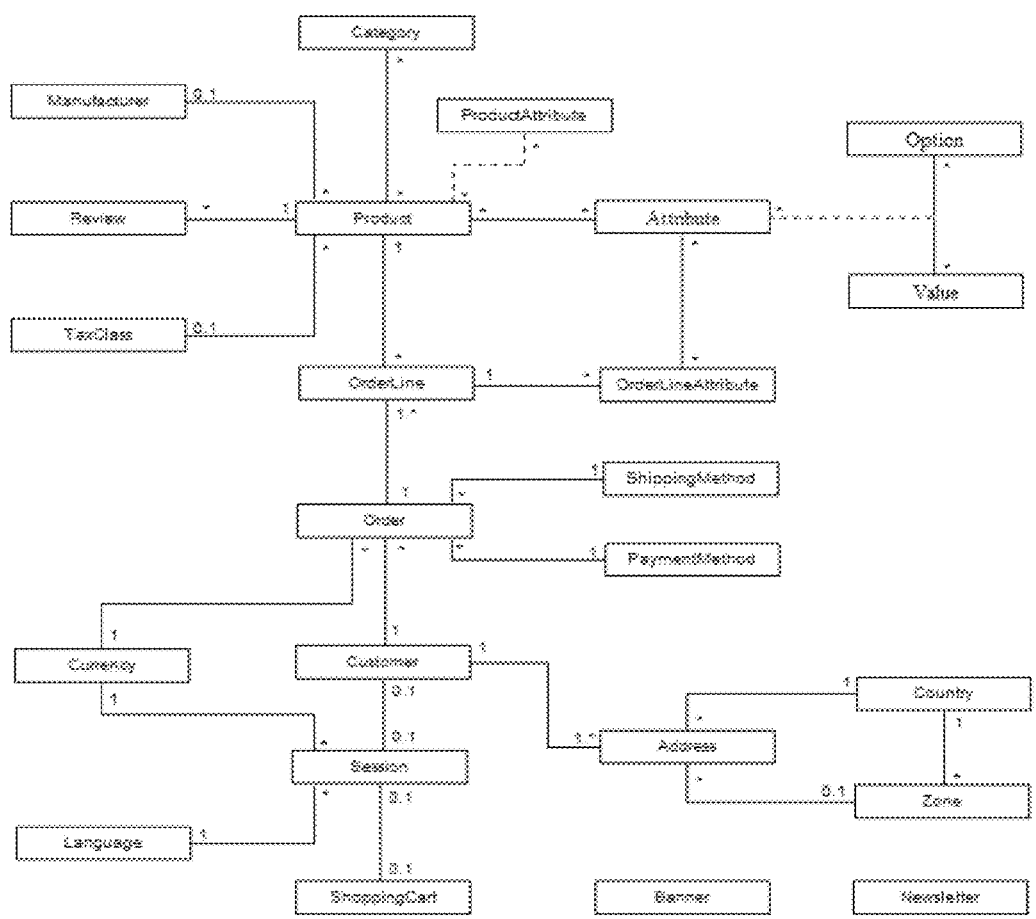
FIG. 17 is a diagrammatic representation of related resource aspects in a software-based commerce-related service engine in accordance with one embodiment.
Figure 18:
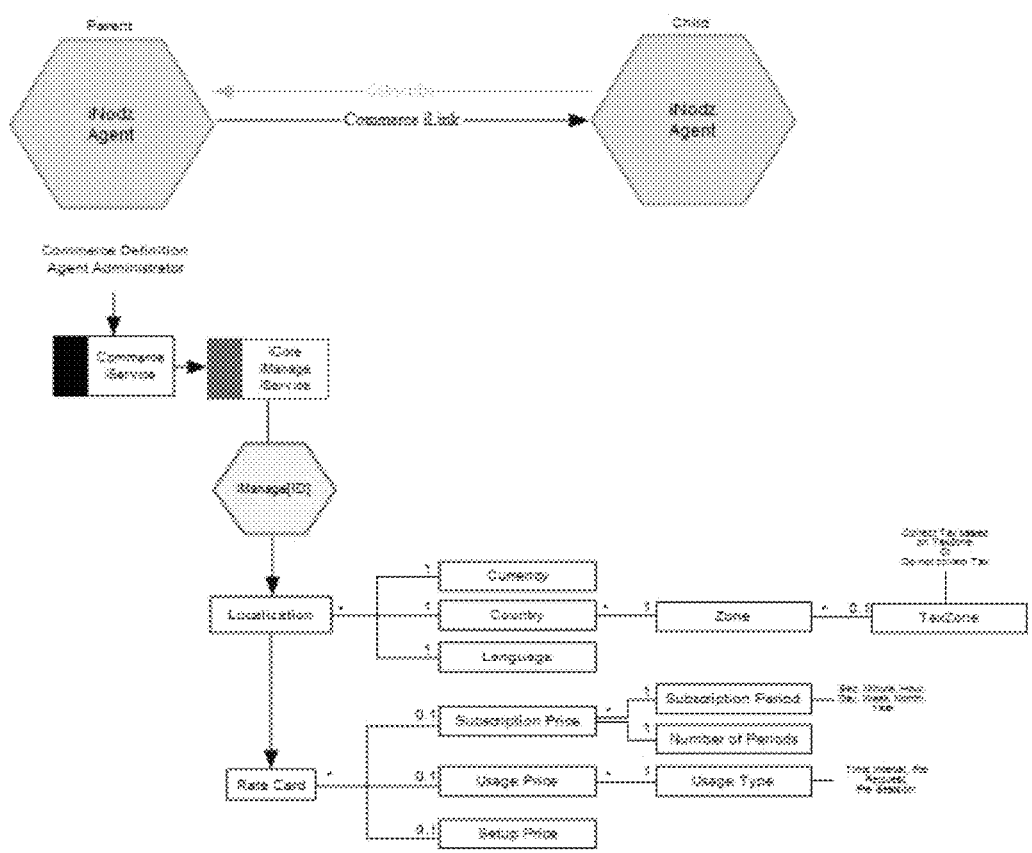
FIG. 18 is a diagrammatic representation of another commerce service engine interactions with a specific resource agent in accordance with one embodiment.
Figure 19:
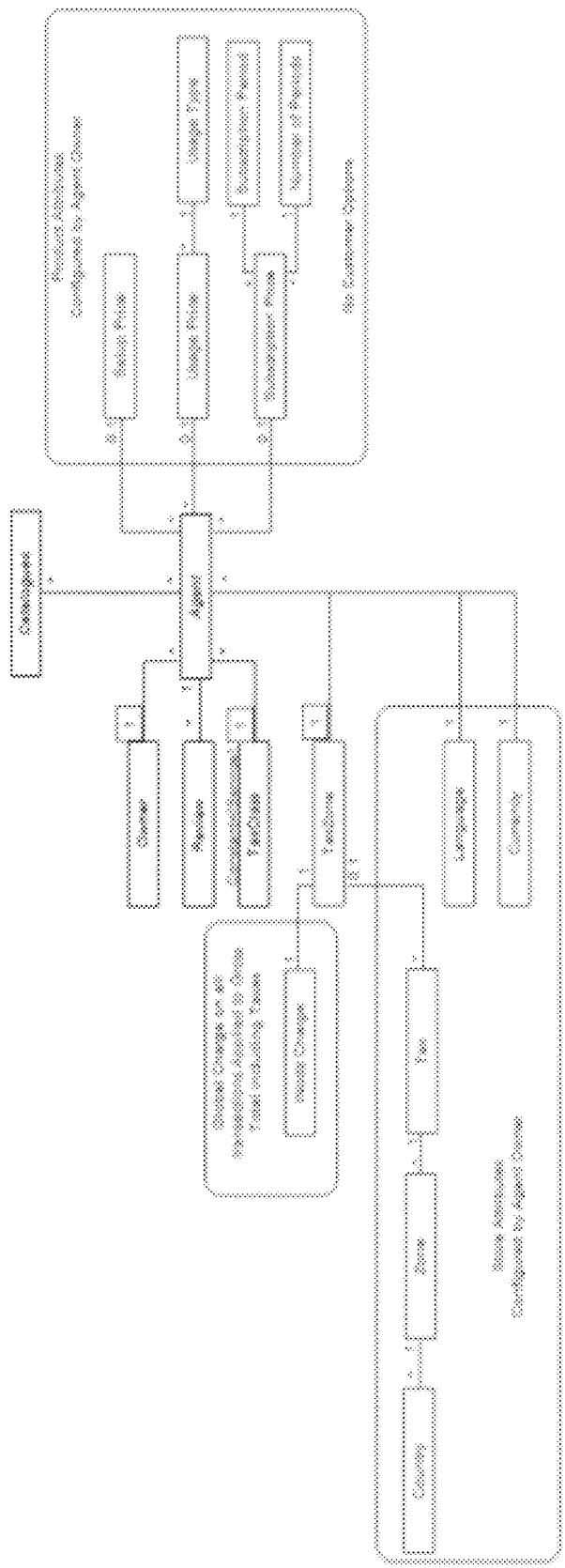
FIG. 19 is a diagrammatic representation of commerce-based process modules that may be generated by the commerce service engine in accordance with one embodiment.
Figure 20:
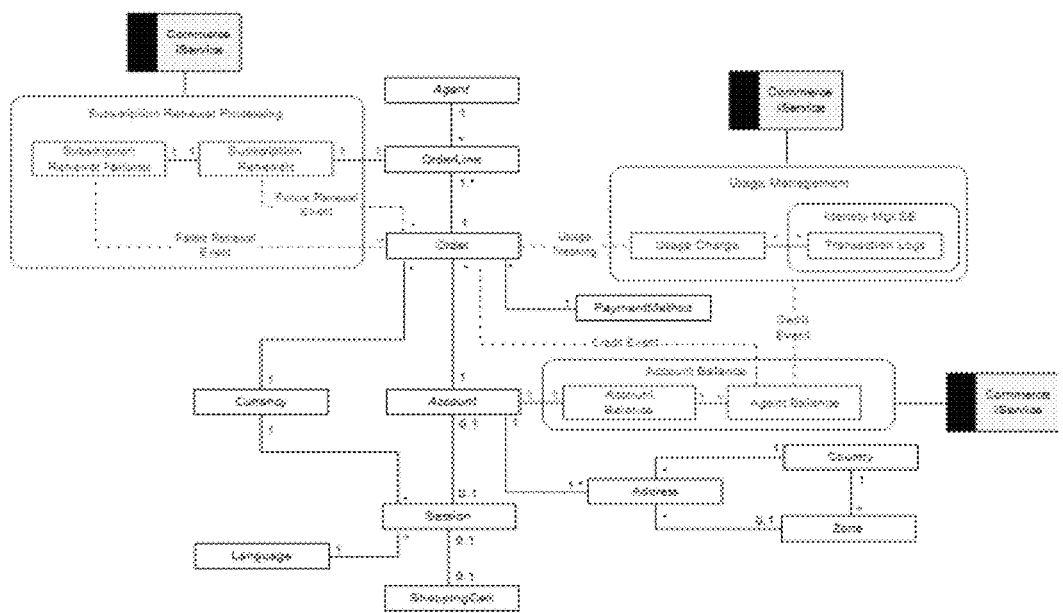
FIG. 20 is a diagrammatic representation of another commerce-based process modules that may be generated by the commerce service engine in accordance with one embodiment.

FIG. 16 refers to the Commerce Service Engine, which describes in more detail the software-based commerce-related service engine, which, through the use of HTTP-based iConnector protocol, interfaces commerce-based functionality across some or all of the resource agents to facilitate exploitation of the corresponding resources. FIG. 16 shoes the various interface objects, add ons (third party applications, as well as resource management system-wide ontologies), administrative function, data layer access, external services, and internal commerce-based process modules. An example of such commerce-based process modules is shown in FIG. 17. There is shown in FIG. 17, the relationship between product category, product (with relationship to manufacturer, review, tax class, user-definable attribute), order line (Product and its selected configuration and quantity), order (collection of specific products and configurations, as well relationship to shipping and payment methods), customer (being an entity/individual with an address, zone, country), session (real-time transactions, also associated with currency and order), and shopping cart (which is Container which holds an Order prior to payment). FIG. 18 shows how the commerce service engine interacts with a specific resource agent via the Manage service, to implement specific services that are only given meaning when associated with information in a specific WSDL associated with the Manage service of a specific resource agent (i.e. localization and rate card, which are depending on characteristics of the resource agent). Other exemplary internal commerce-based process modules that may be generated by the commerce service engine may include processes shown in FIGS. 19 and 20. Respectively, these show establishing an agent data model for purchases, notably including a subscription purchasing model which may be associated with specific localization, and an order data model permitting processing and data management add-ons to existing process modules, specifically as shown in FIG. 20, subscription renewal processes, usage management for inventory control, and account balance management. Each such process contribute to the autonomy of resource agents to conduct commerce-based events without prior authorization, while maintaining appropriate safeguards relating to purchasing and inventory.

In some embodiments, there are provided computer-implemented resource agents for managing a resource via a communications interface with a resource-related computing device, user-defined resource characteristics for the resource agent being stored in a registry as, in some embodiments, as set of WSDL scripts accessible via addressing information associated with said resource agent, said resource characteristics including an access contract with said resource-related computing device, wherein in some embodiments the resource-related computing device may include a resource, a computing device that tracks data, information or status associated with a non-network enabled resource (e.g. a location monitor on a person), or a network thereof, for making at least one aspect of said resource available to a resource agent rights holder, wherein the rights-holder may be the owner or creator of the resource agent or the rights holder may be a third party to whom the owner or creator has granted rights to a sub-resource having some or all aspects of governance over some or all aspects of the resource, at least one aspect of governance over at least one aspect of the resource agent being distributable by the resource agent rights holder to at least one second resource agent rights holder, wherein governance comprises the ability to authorize the further distribution of any one or more aspect of governance by the at least one second user over an aspect of the resource agent over which the first user has governance.

Figure 21:
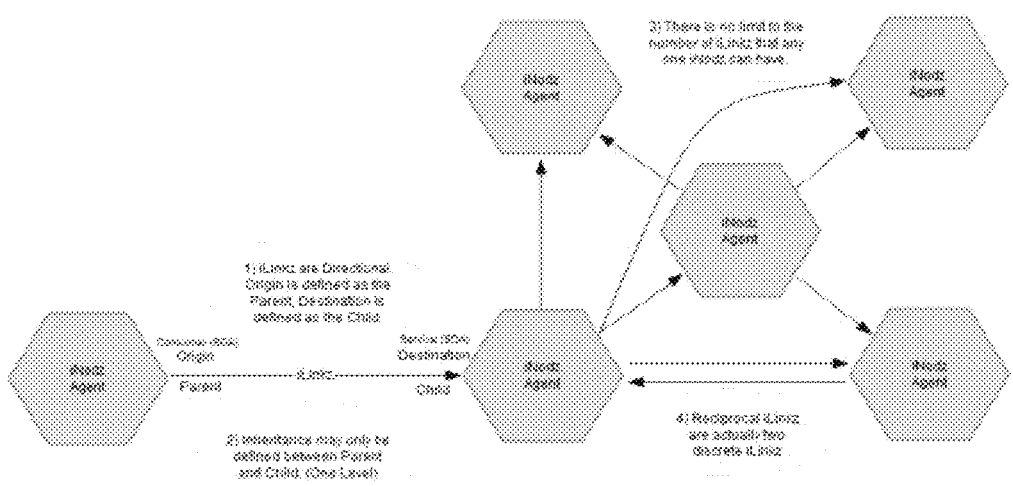
FIG. 21 is a diagrammatic representation of a interoperable relationships of resource agents through links established in accordance with one embodiment.

In general, resource agents are deployed and operate in a normalized environment within the uRMS. The relationships created between different resource agents are called iLinkz, which may be established in accordance with iLinkz services in one or more of the different resource agents, such relationships embodied in information set forth in the WSDL documents. FIG. 21 shows representative relationships through links established according to the iLinkz service. As shown in FIG. 21, iLinkz are directional with the origin defined as the parent (or service provider) and destination as the child (or consumer). Inheritance in some embodiments may only be defined from parent (original resource agent) to child (resource agent), although multi-generational inheritance may be provided in other embodiments. There is no limit to the number of iLinkz that a resource agent may have. In some embodiments, reciprocal iLinkz are actually two discrete iLinkz. Circular references are prevented through the use of NameSpace encoding within the respective WSDL and identity and address registration in the REG. Only a single iLinkz can exist between a parent and child, and children resource agents are subject to the access contract of the parent resource agents. Parent resource agents can limit how their functions are used. For example, a child may not resell the parents functions or a child may not provide access to the parent functions to others (which ought not to be confused with a child selling access to a service that is inherited from its parent, which is permitted).

Figure 22:
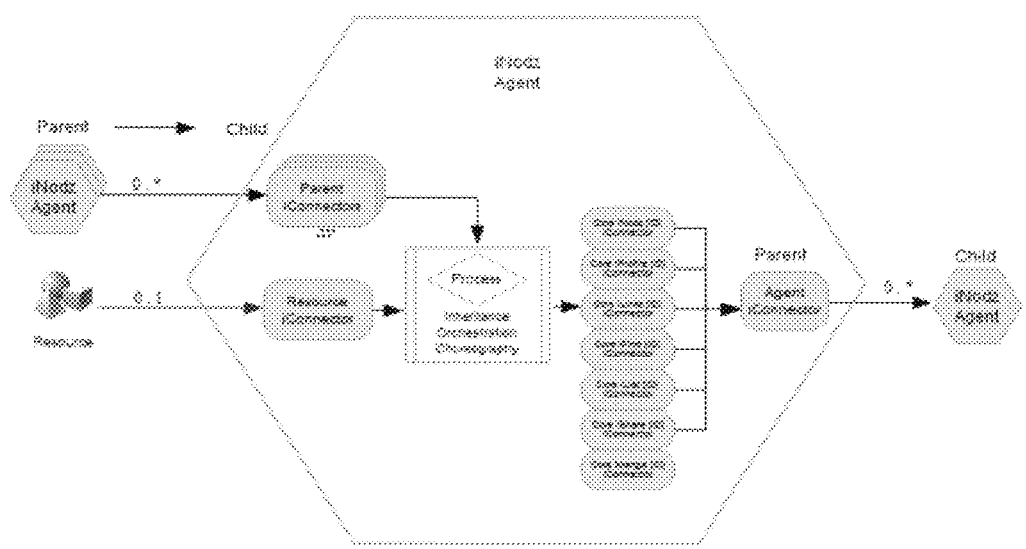
FIG. 22 is a diagrammatic representation of another set of interoperable relationships of resource agents through links established in accordance with one embodiment.
Figure 23:
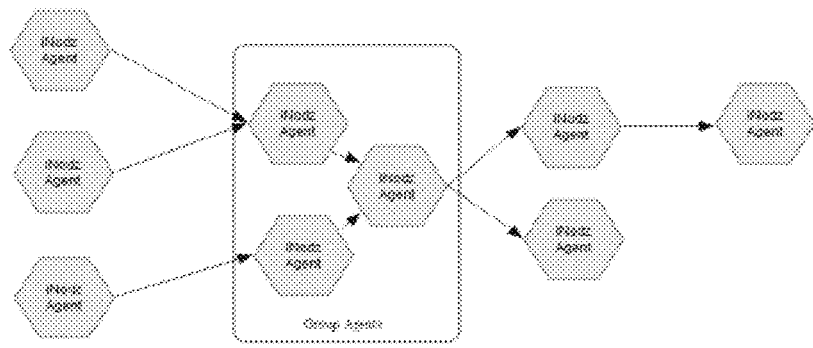
FIG. 23 is a diagrammatic representation of another set of interoperable relationships of resource agents through links established in accordance with one embodiment.
Figure 24:
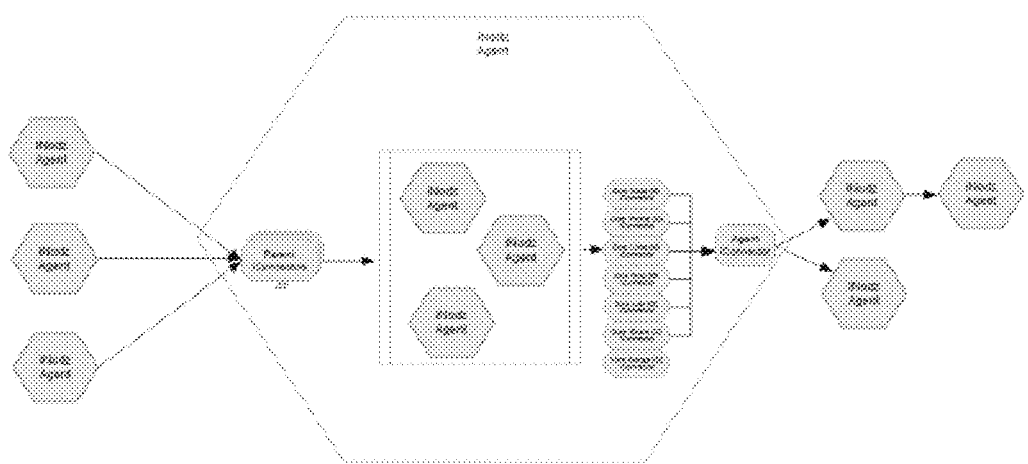
FIG. 24 is a diagrammatic representation of another set of interoperable relationships of resource agents through links established in accordance with one embodiment.

FIG. 22 shows a variant of FIG. 3, illustrating limitations on relationships. Likewise, FIGS. 23 and 24 show variants of relationships between different resource agents.

In embodiments, multiple iLinkz types are supported. iLinkz types described as containers (grouped resource agents) and contextual (sub-resource with different profile but other shared characteristics), may have inheritance characteristics, wherein the parent iConnector interfaces are inherited unchanged. There are iLinkz types from composed links (including a defined process or designated subset of interface operations), which may have orchestration characteristics associated with sequenced processes or an order of operations. Lastly, there are commerce-based and coordinated links having choreography characteristics, wherein logic processing between multiple resources can be implemented. While child resource agents can be created, and the governance associated therewith distributed in accordance with the services, the parent is protected from unauthorized use by ensuring that the parent resource agent interfaces the child only, and not vice versa. In addition, iLinkz may have three states: a) Active—The iLinkz is an active relationship; b) Suspended—Three possible suspended conditions i) Cancelled—The Parent has suspended access to the iNodz; ii) Changed—The relationship which was created has been changed by the Parent requiring the acknowledgement of the child; or iii) Held—Conditions for access are not satisfied; and c) Broken—the resource agent (or its resource) cannot be reached or is not responding.

Figure 25:
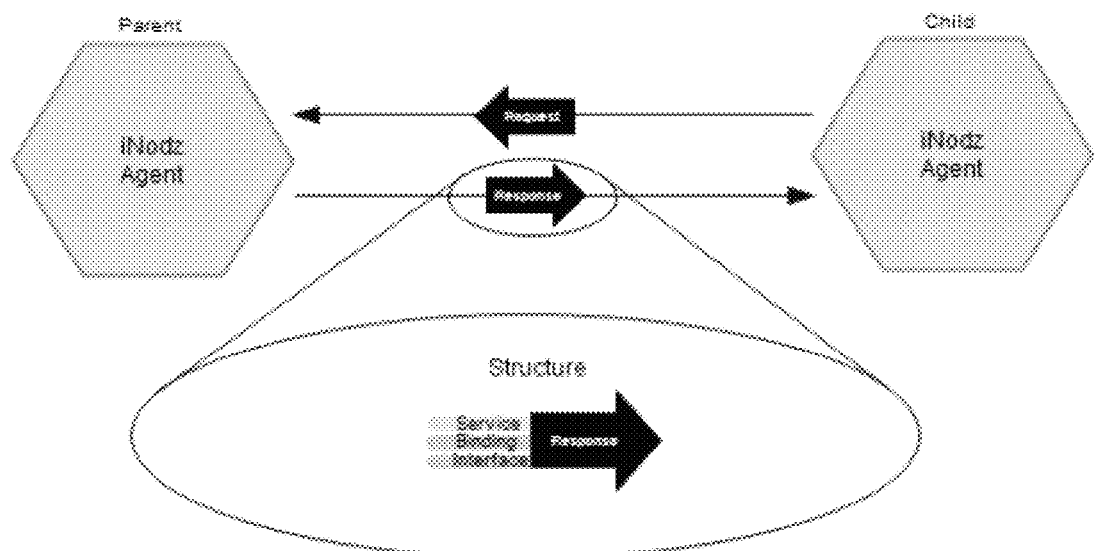
FIG. 25 is a diagrammatic representation of constituent service, binding, and interface components of requests and responses between interoperable resource agents in accordance with one embodiment.
Figure 26:
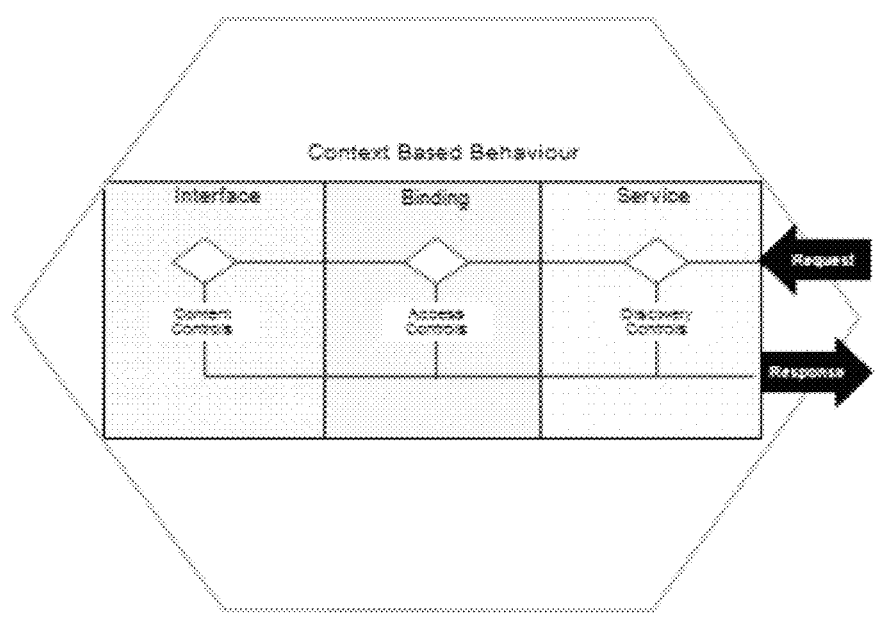
FIG. 26 is a diagrammatic representation of other constituent service, binding, and interface components of requests and responses between interoperable resource agents in accordance with one embodiment.

Referring to FIGS. 25 and 26, there is shown diagrammatic illustrations of, respectively, the constituent service, binding, and interface components of every request and its corresponding response, and context-based behaviour of the processing of responses into request by assessing the discovery controls, access controls, and content controls of each response/request pair. The discover control provides for publishing to resource agent information to catalogue(s) so that it can be discovered by others. The discover control specifically controls for publishing to catalogues, using tagging and semantics for discovery (via the Find service of the resource agent receiving the request), describes the resource agent and its owner assigned name (Profile), and maintains the iDNA (address) and resource agent system ID (iNodz). The Access control is for controlling access to the resource agent by other entities. Specifically, it controls access using roles, access rules (policy), invitations, requests, and blocking (Share), access logging and rules management/setting (Manage), maintaining lists of roles, rules, invitations for other entities, requests by other entities, and blocking entities, and any security definition through and by the iConnector defines any Security Protocol (Profile). Lastly, content controls customize the content of the response in accordance with the web services made available through the services. Specifically, they control content of the response using inheritance, orchestration, choreography, and commerce characteristics as defined in the iLinkz, checking for, and acting in accordance with user defined groups to manage how behaviour is applied to individual resource agents and groups of resource agents.

In embodiments, a resource agent is a representation of a resource and its access contract. A resource agent does not require, but can operate in accordance with, change to the resource it represents. Each resource agent has its own governance model set by its owner/administrator in accordance with the services. The resource agent is originally owned by its creator, but ownership may be transferred to another and rights associated with a resource agent are assignable allowing other persons to administer. In embodiments, a resource agent is portable to any network (a network other than uRMS network). Each resource agent can be programmed to change its behaviour based on the nature of its use though the use composition services, and they can operate independently and autonomously from its owner/administrator through permissions, links, and coordination services (among others). The resource agents can represent any resource type (Person, Place, Thing) and provide a normalized environment which allows any resource agent to interact with other resource agents (provided they are permitted by the rules of governance).

Figure 27:
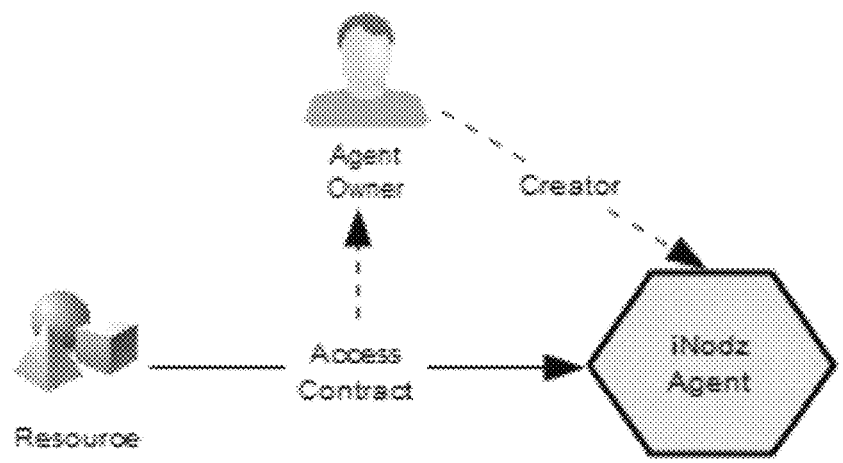
FIG. 27 is a diagrammatic representation of relationships between resource, resource agent, and resource agent owner in accordance with one embodiment.
Figure 28:
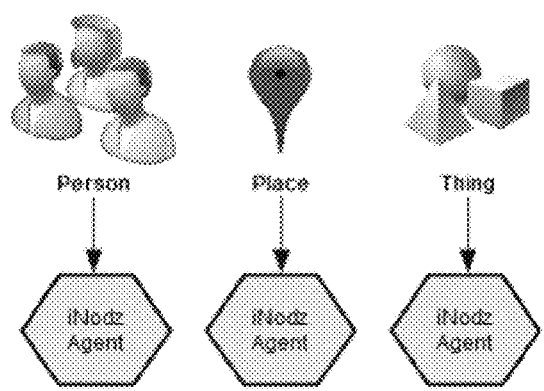
FIG. 28 is a diagrammatic representation of exemplary resources for management by a resource agent in accordance with one embodiment.
Figure 29:
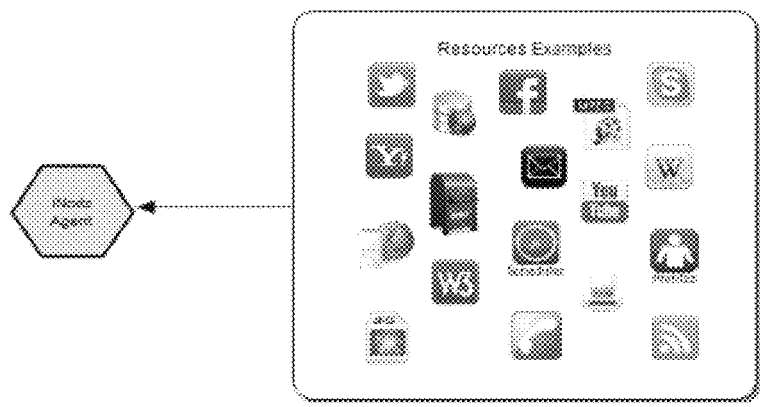
FIG. 29 is a diagrammatic representation of exemplary resources for management by a resource agent in accordance with one embodiment.
Figure 30:
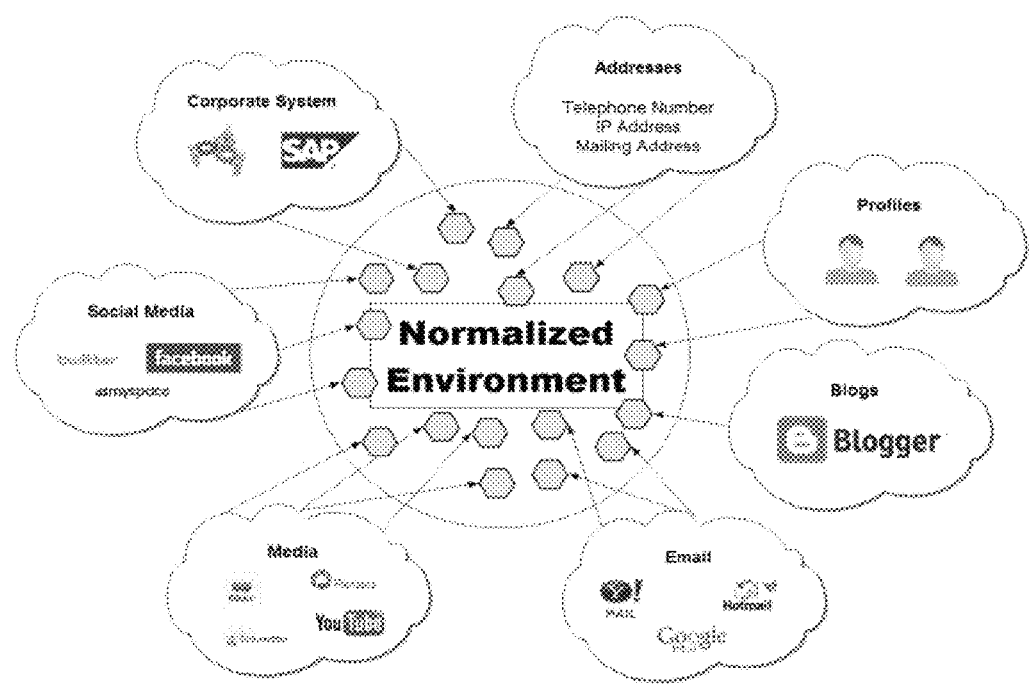
FIG. 30 is a diagrammatic representation of a normalized environment of a resource management system in accordance with one embodiment.
Figure 31:
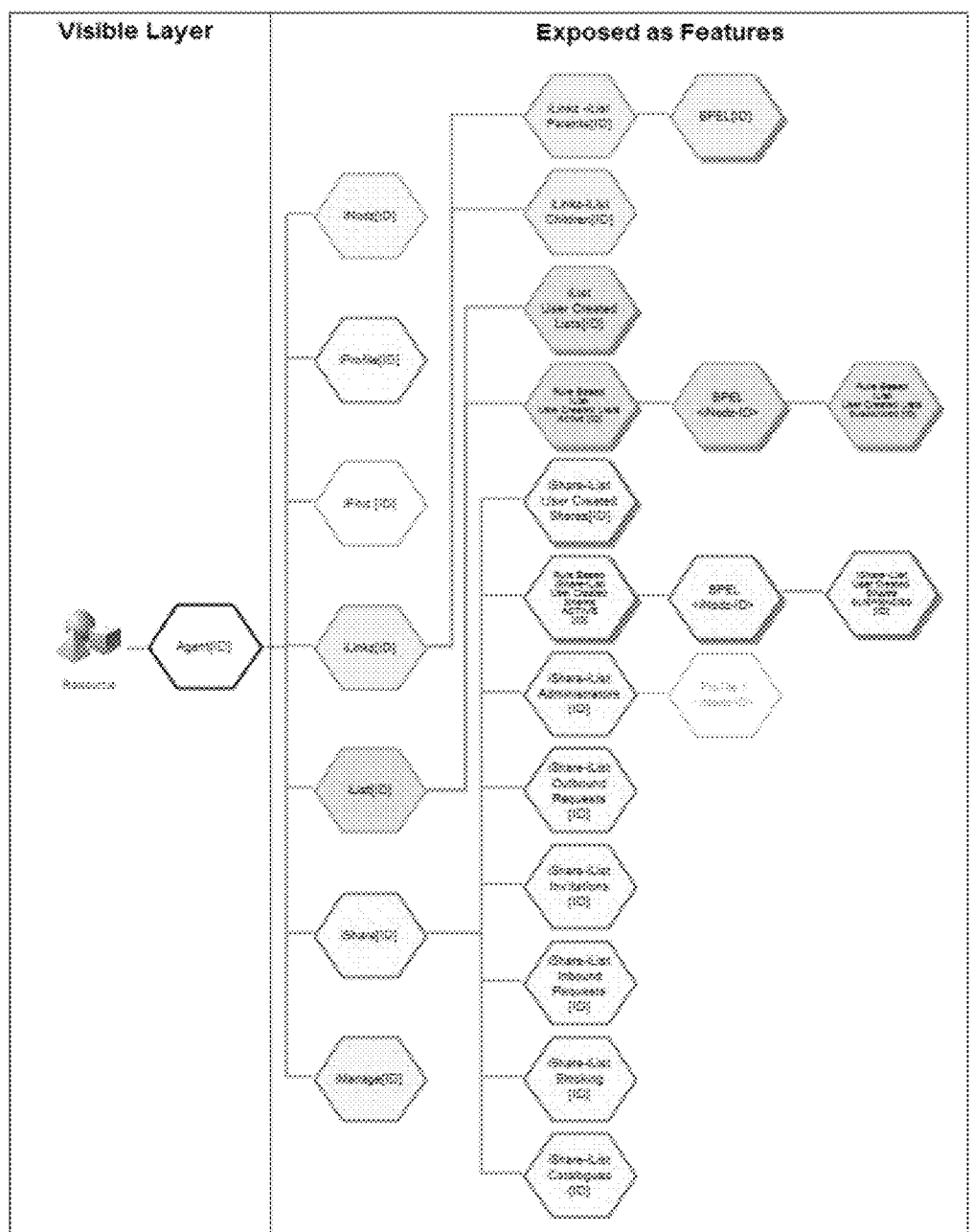
FIG. 31 is a diagrammatic representation of the architecture of a resource agent in accordance with one embodiment.

FIG. 27 depicts a possible configuration of relationships between resource, resource agent (referred to in the figure as an "iNodz Agent"), and resource agent owner. FIGS. 28 and 29 depict exemplary resources for management by a resource agent. FIG. 30 is a diagrammatic representation of multiple types of resource, and how such diverse resources (both network-enabled and non-network enabled) can be represented and managed on a normalized environment through the compatibility of a plurality of resource agents, despite user-defined semantics, owing to the ontological improvements associated with resource management systems described herein. FIG. 31 is a variation of FIG. 2 except the visible layer is shown as distinct from layer that, while not shown as a visible interface, there are numerous exposed features, including features and services exposed underneath each service.

Figure 32:
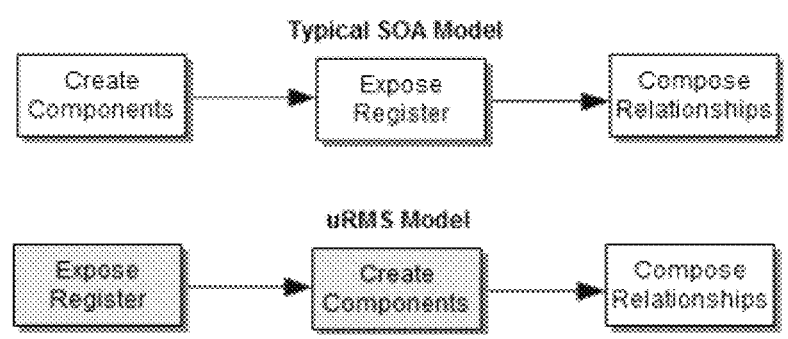
FIG. 32 is a diagrammatic representation of an alternate SOA architectures for creating a resource agent for resource management in accordance with one embodiment.

FIG. 32 depicts alternate SOA architectures for creating a resource agent. A typical SOA model reduces a service to components prior to registering the resource to the network. While uRMS can facilitate this approach partially, uRMS has been developed to focus on the registration of a complete resource and permit the development of new components later through the creation of sub-resources. This provides for the capturing of all resource configuration decisions within uRMS, as well as for ongoing development and evolution of resources and resource exploitation, with a significant level of granularity on resource development and governance distribution that is not available to pre-determined resource registrations. Through the creation of profiles, aspects, portion, characteristics, service, degree of control, data, authorization limitations, combinations, compositions, or any such feature or authorization relating to the resource and/or the associated governance thereof, in sub-resources (or child resources), wherein such features and/or authorizations need not be defined as such in the original (or parent) resource agent or governance associated therewith, an almost unlimited control over both (i) the quantum of new such features and authorizations that can be created, and (ii) the degree to which such new feature features and authorizations can be divided into discrete elements, wherein the only limitations on both are established by the definitional and governance limitations associated with the parent (or original) resource agent, if any, and the quantum and degree of governance distribution granted by the parent resource agent rightsholder, if there is one. In some embodiments, the isolation of the resource agent governance from the resource (and/or resource platform/network), and by enabling profiles, aspects, portion, characteristics, service, degree of control, data, authorization limitations, combinations, compositions, or any such feature or authorization relating to the resource and/or the associated governance thereof to be generated in sub-resources after creation of—and irrespective of the existence of such features or authorizations in—a parent resource agent, the architecture provides for governance distributability, resource creation, and resource utilization that is limited only by the resource owner's imagination and desire.

Figure 33:
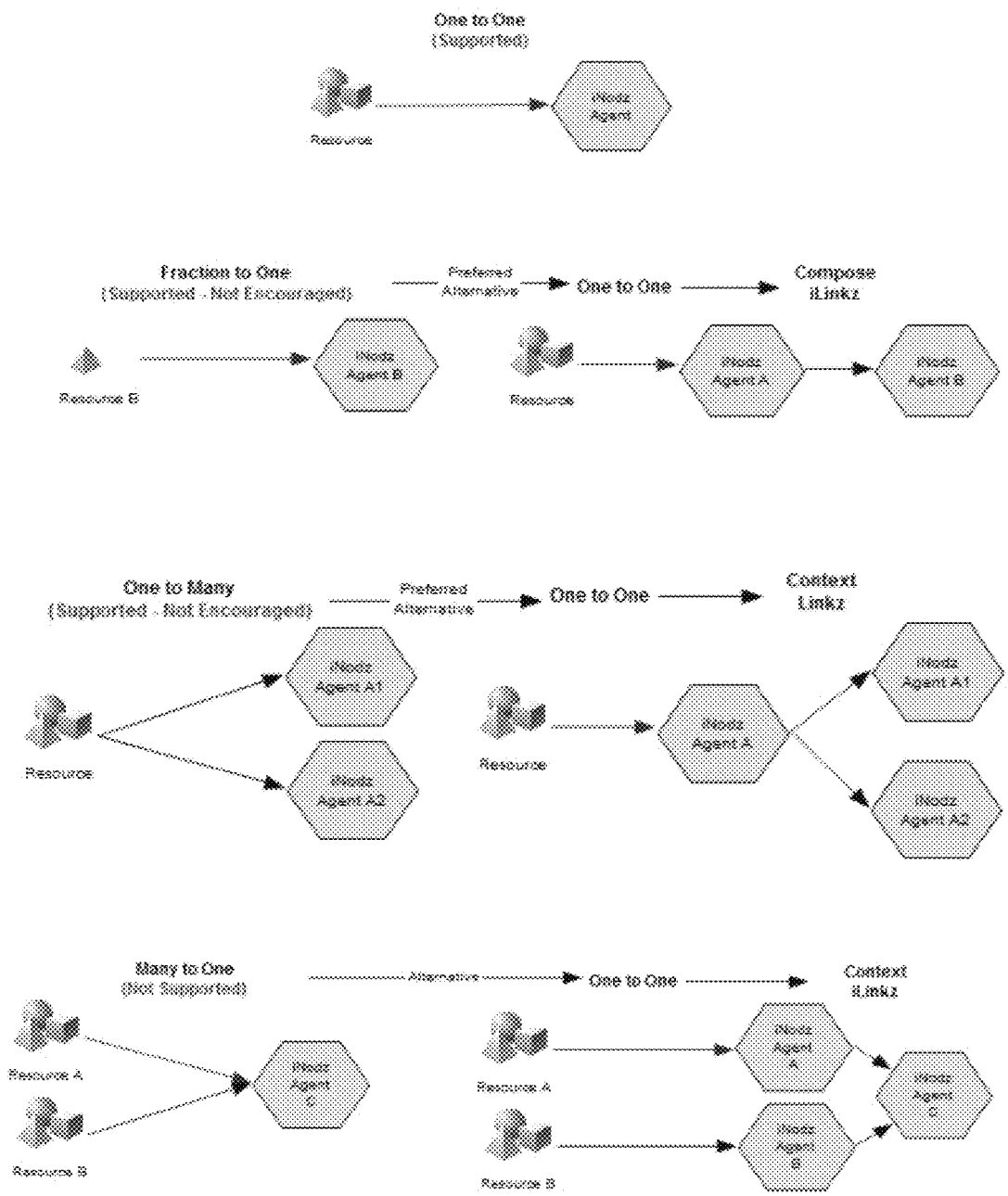
FIG. 33 is a diagrammatic representation of various resource to resource agent relationships in accordance with embodiments.

FIG. 33 shows various resource to resource agent relationships, including one-to-one (preferred), fraction to one (not preferred and may not be supported in some embodiments), one-to-one plus compose iLinkz (as an alternative to fraction to one), one-to-many (not preferred and may not be supported in some embodiments), one-to-one plus context iLinkz (as alternative to one-to-many), many-to-one (not preferred and may not be supported in some embodiments), and one-to-one plus coordinate iLinkz (as an alternative to many-to-one).

Figure 34:
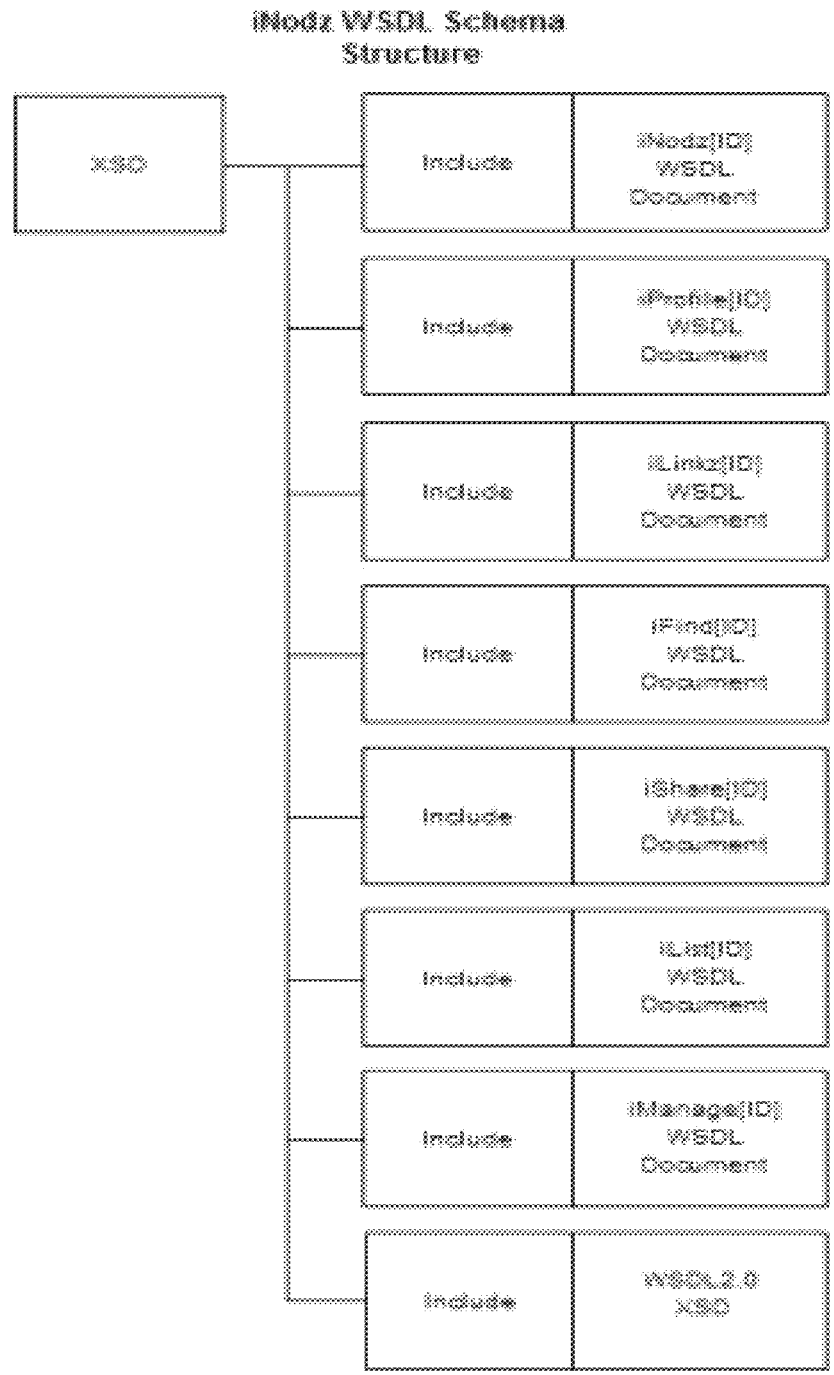
FIG. 34 is a diagrammatic representation of an exemplary distribution language schema of a resource agent in a resource management system in accordance with one embodiment.

In embodiments, a WSDL schema is used to describe to describe resource agents. The WSDL Schema in embodiments hereof (the "iNodz WSDL Schema") is a unique schema definition designed to ensure all resource agent WSDL documents conform to the requirements of the uRMS. The iNodz WSDL Schema is expressed as an .XSD document (XML Schema Definition) which is an xml file. It formally specifies the structural requirements and elements which must be included in an iNodz WSDL document for it to be registered to the Centrex Reg (UDDI registry) and to be executed by the Centex Plex (JBI Runtime Environment). The iNodz WSDL Schema incorporates the standard WSDL 2.0 schema while imposing the required iNodz Schema structure. The result is that all iNodz WSDL documents are formatted to comply with the iNodz Schema and incorporate the WSDL2.0 element definitions. The standard WSDL is http://www.w3.org/2006/01/wsdl/wsdl20.xsd and the iNodz WSDL Schema is shown diagrammatically in FIG. 34.

Figure 35:
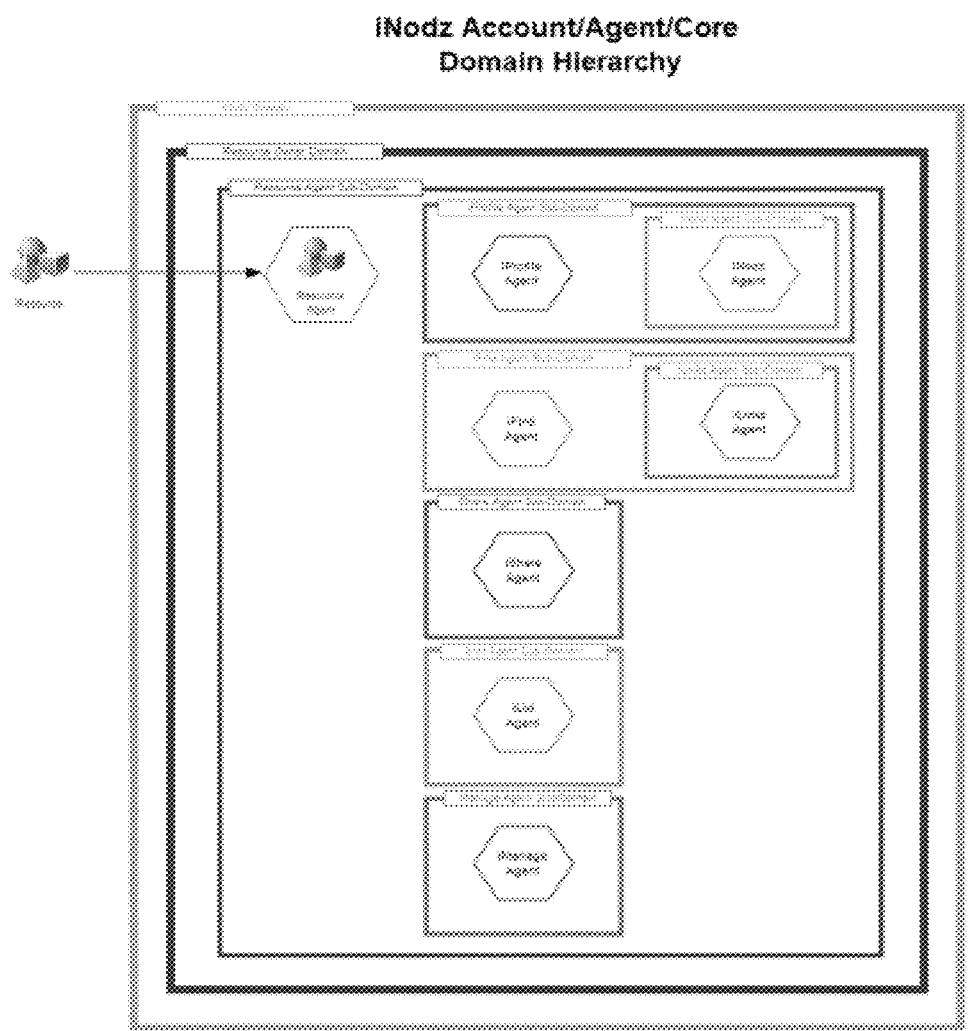
FIG. 35 is a diagrammatic representation of the architecture of a resource agent in accordance with one embodiment.
Figures 36, 37:
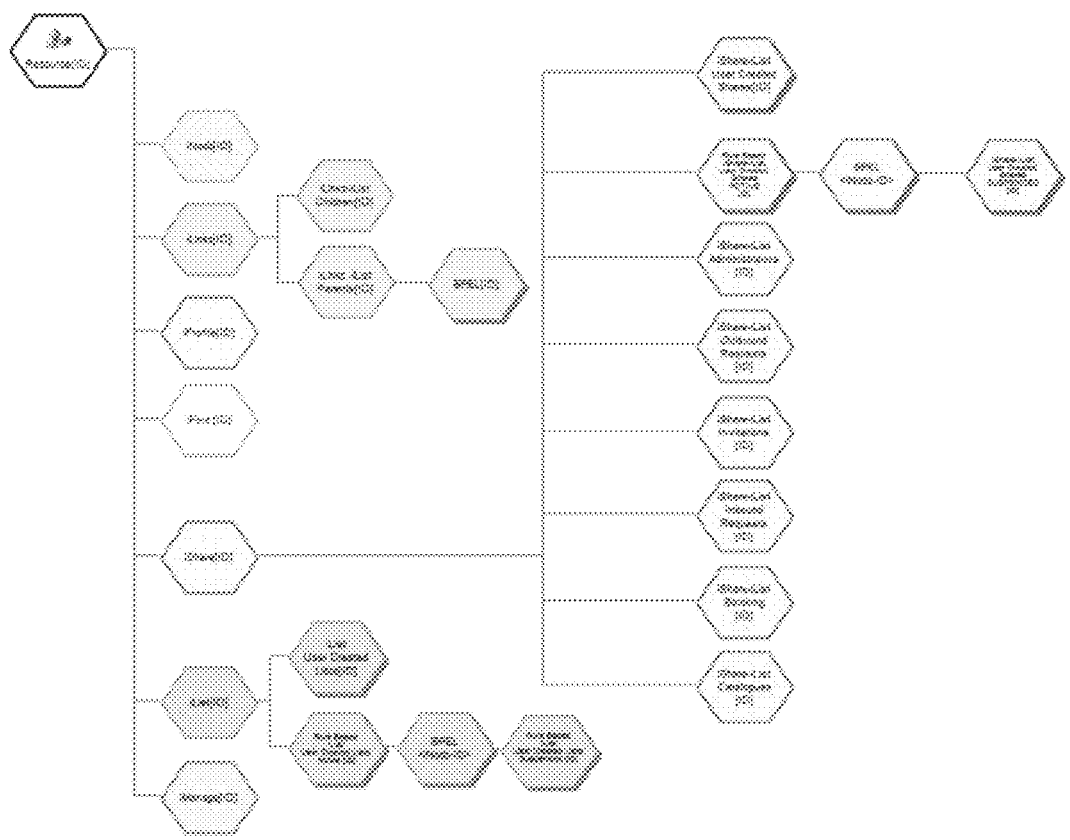
FIG. 36 is a diagrammatic representation of a resource agent, and web services thereof, of a resource management system in accordance with one embodiment.
FIG. 37 is a diagrammatic representation of naming syntax and/or addressing protocol for a resource management system in accordance with one embodiment.

As part of the services (in some embodiments referred to as Core Services or Services) associated with a resource agent is the iNodz service which, in addition to providing tombstone and other identification information for each unique resource agent, also provides iDNA. The primary purpose of the iDNA is to provide network address to a resource agent. FIG. 35 shows the hierarchy of account/agent/core domains, and the isolation thereof from the corresponding resource. FIG. 36 shows the hierarchy of each of the core services and related services functions. In some embodiments, resource agents ID's are created by the Core iNodz service as part of the validation process of the WSDL document and registration of the document to the Centex Reg (UDDI). WSDL Namespace declarations rely on the iDNA Namespaces to provide a level of direction to specific identifiers, thus making it possible to distinguish between identifiers with the same exact name. This allows each resource agents to develop their own independent naming conventions. FIG. 37 depicts a standard iDNA naming syntax that can be adapted to various naming conventions. For example, a first example agent web service endpoint could be http://www.iNodz.com/Agent001?Operation#parameter; alternatively, it could be http://www.iNodz.com/Agent001/iShare001?Operation#parameter. Either way, an iDNA can be generated that is a unique identifier of a specific web service of a resource agent, addressing information for accessing same, and, possibly in some embodiments, comprises information relating to a parent resource agent.

Figure 38:
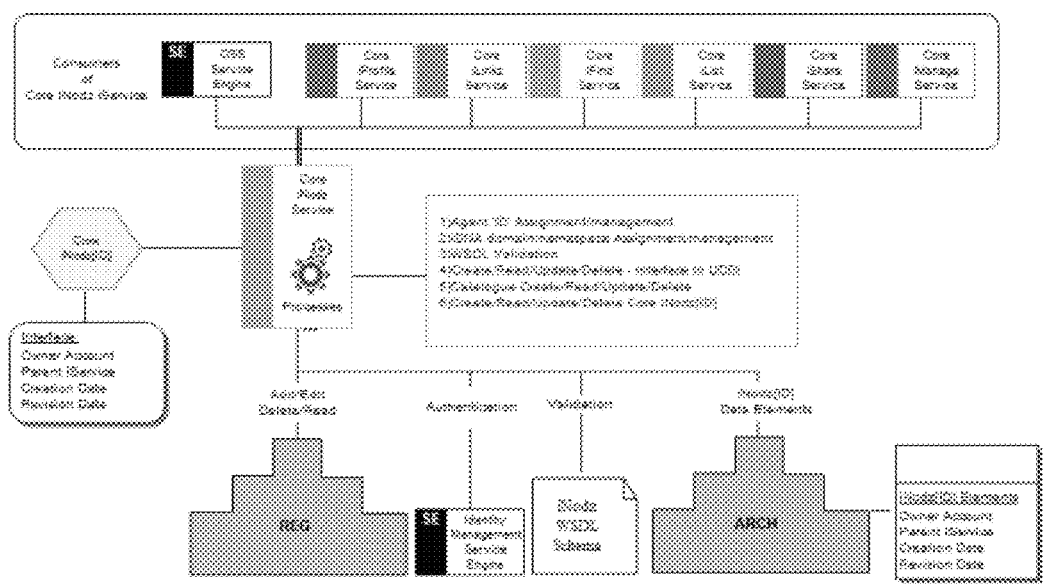
FIG. 38 is a diagrammatic representation of a web services interface between a resource agent and a centralized administrative service of a resource management system in accordance with one embodiment.

FIG. 38 depicts the interface associated with the iNodz service (such ID information comprising owner account information, parent service ID, creation data, revision date) and its relationship with the centrex, consumers (i.e. other resource agents), and other processes (add/edit/delete/read to REG, authentication, validation), as well as recordation of iNodz ID information specified above in the ARC.

Figure 39:
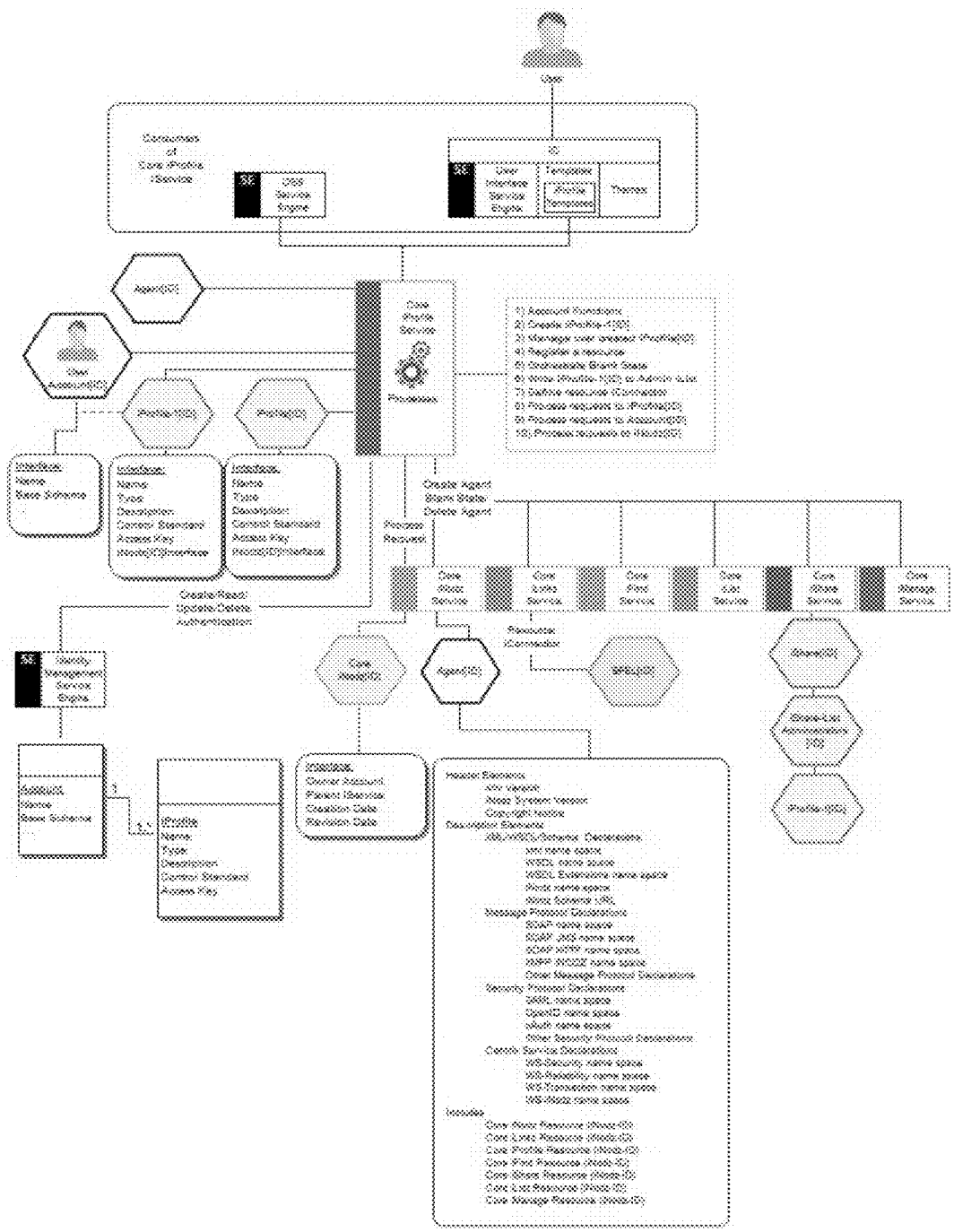
FIG. 39 is a diagrammatic representation of another web services interface between a resource agent and a centralized administrative service of a resource management system in accordance with one embodiment.

FIG. 39 depicts the Profile schema implemented in one embodiment of the instant disclosure.

Figure 40:
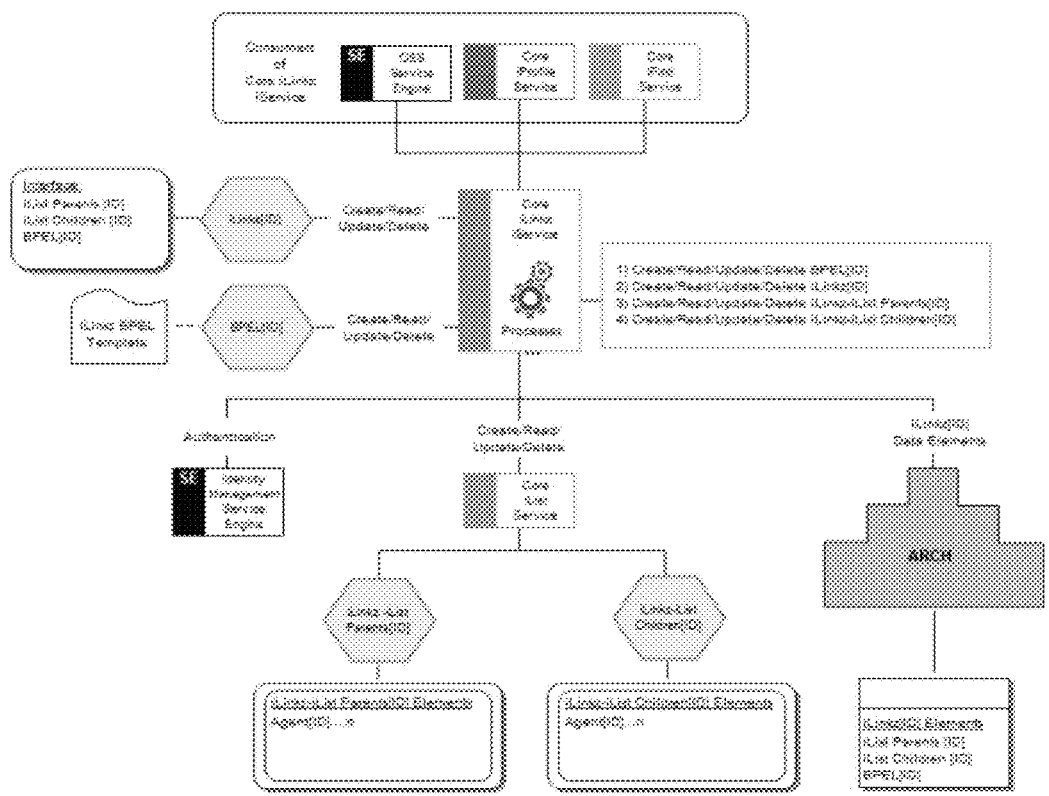
FIG. 40 is a diagrammatic representation of another web services interface between a resource agent and a centralized administrative service of a resource management system in accordance with one embodiment.

FIG. 40 shows an overview of the iLinkz service. Core iLinkz service performs operations that are grouped into two categories: (1) iLinkz—Management of Agent Relationships; and (2) BPEL—Management of Interface Responses. iLinkz elements include List Parents—A list of all Parent Agents, List Children—A list of all Child Agents, BPEL—A BPEL expression complying to iNodz BPEL Template using BPEL2.0 which processes child requests and modifies responses based on the logic the BPEL contains.

Figure 41:
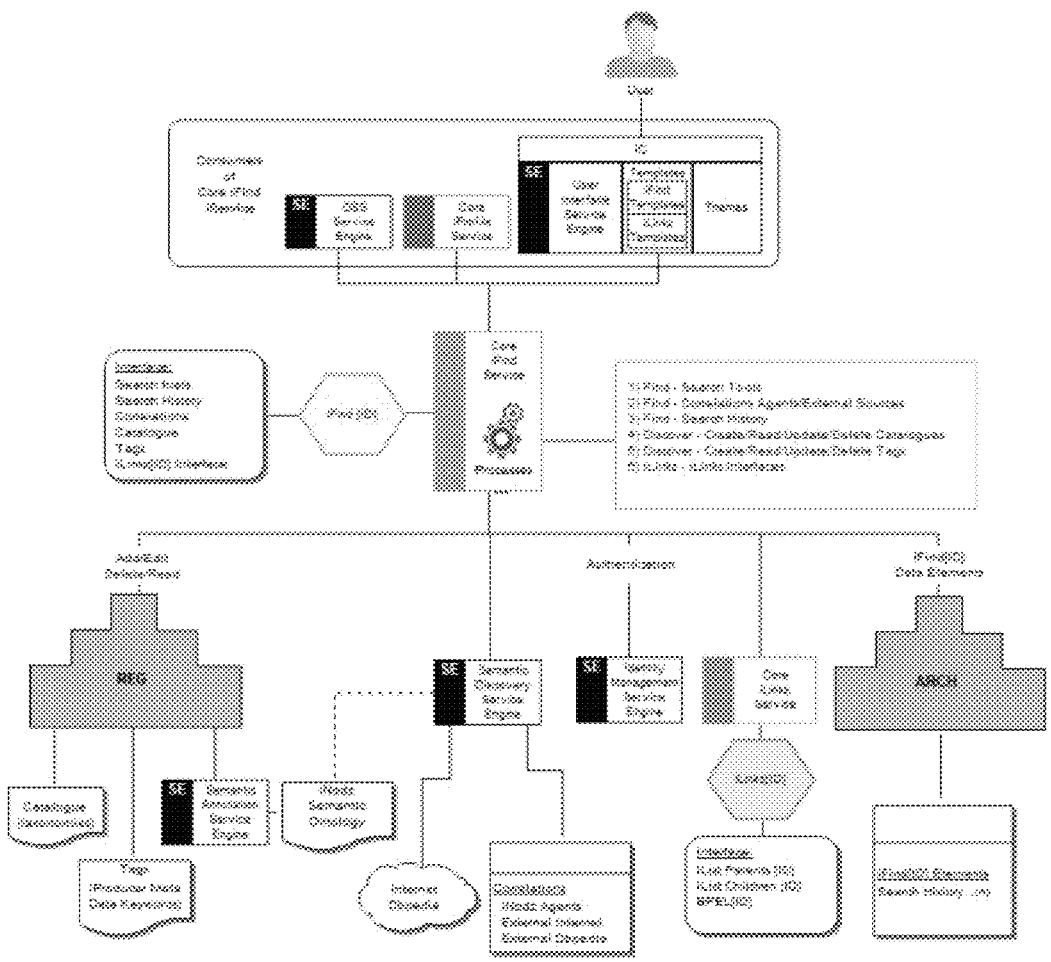
FIG. 41 is a diagrammatic representation of another web services interface between a resource agent and a centralized administrative service of a resource management system in accordance with one embodiment.

FIG. 41 shows an overview of the Find service, and its interaction with other aspects of the resource management system and/or other processes. Core Find service performs operations that are grouped into three categories: (1) Finding—Searching for resource agents and resources; (2) Discovery—Enabling a resource agent to be discovered; and (3) iLinkz—Management of iLinkz Interface Requests and Responses. Core Find elements include search history, correlations internal resource agents, and correlations external sources.

Figure 42:
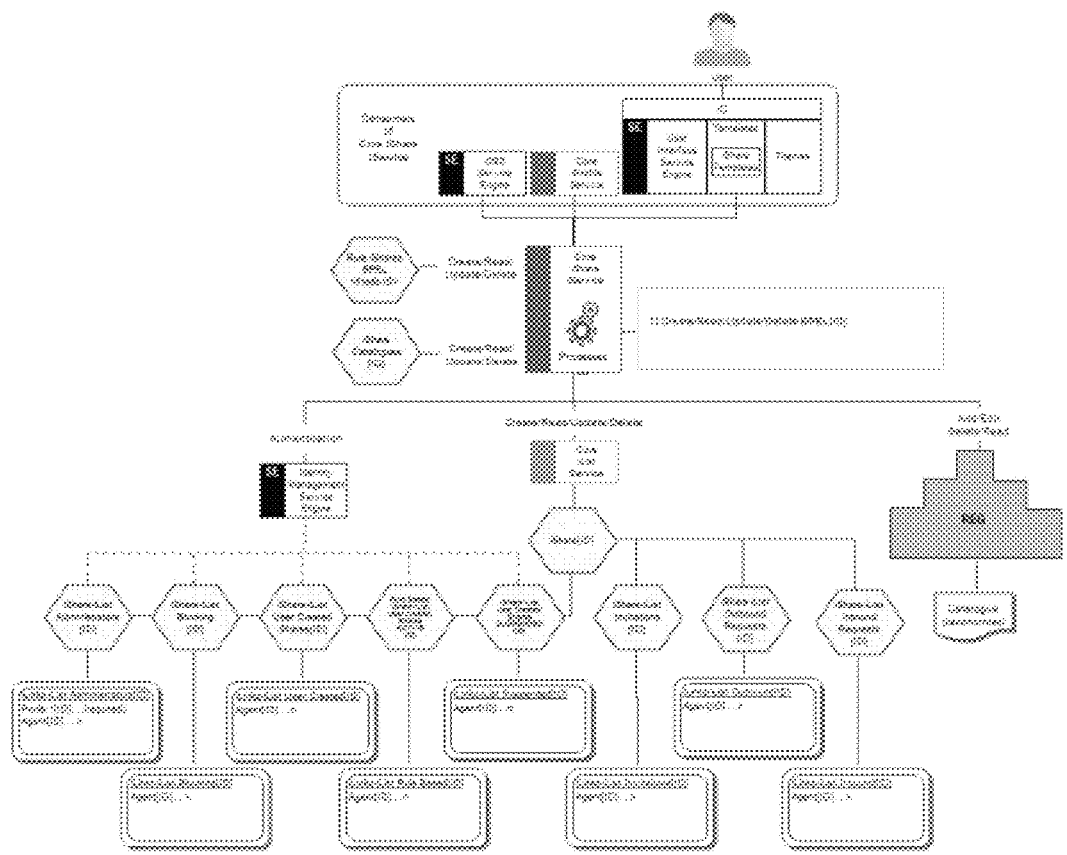
FIG. 42 is a diagrammatic representation of another web services interface between a resource agent and a centralized administrative service of a resource management system in accordance with one embodiment.

FIG. 42 shows an overview of the Share service, and its interaction with other aspects of the resource management system and/or other processes. Core Share service performs operations that are grouped into three categories: (1) Shares—Manages sharing associated to the associated resource agent; (2) Catalogue—Manages which catalogues a resource agent is published to; and (3) Rules—Manages share rules associated to a resource agent.

Figure 43:
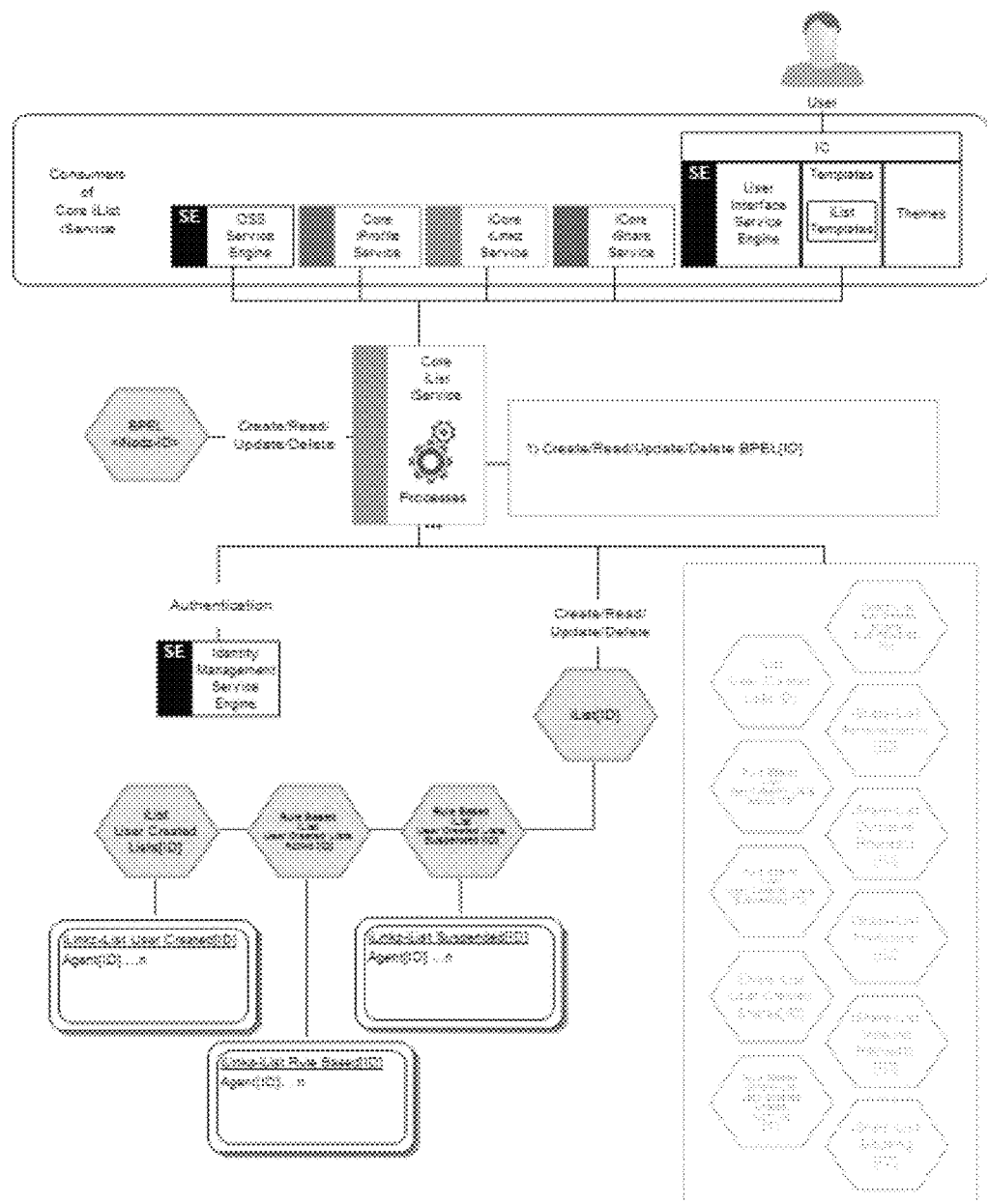
FIG. 43 is a diagrammatic representation of another web services interface between a resource agent and a centralized administrative service of a resource management system in accordance with one embodiment.

FIG. 43 shows an overview of the Commerce service, and its interaction with other aspects of the resource management system and/or other processes. Core Commerce service manages all Lists and creates rule based lists in data storage. The Commerce service manages all Lists within uRMS, manages user created lists, manages Rule Based lists, manages Suspended form Ruled Based list, and, using the applicable BPEL, implements rules based lists.

Figure 44:
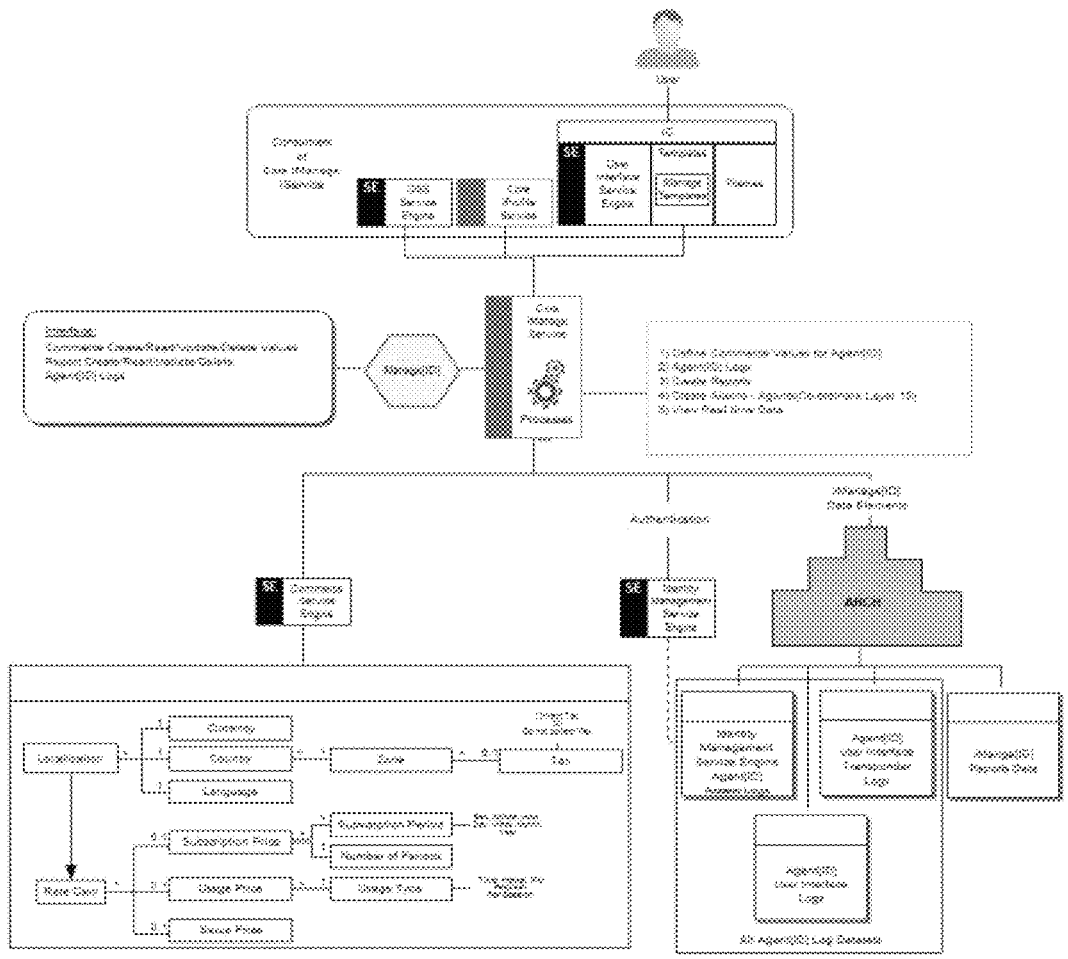
FIG. 44 is a diagrammatic representation of another web services interface between a resource agent and a centralized administrative service of a resource management system in accordance with one embodiment.

FIG. 44 shows an overview of the Manage service, and its interaction with other aspects of the resource management system and/or other processes. Core Manage service performs operations that are grouped into three categories: (1) Commerce Values—Create/Read/Update/Delete commerce values; (2) resource agent activity logs—access and update all activity logs associated to a resource agent; and (3) Reports—Create Reports/Agents/Alarms.

In some embodiments, Core services are implemented as Java EE7 Standard for deployment on an application server. Core services utilize native ESB messaging exclusively (SOAP—JMS messaging). Core Commerce service may also support iNodz XMPP Extended messaging in some embodiments.

In accordance with one or more embodiments, the domain of the virtualized resources are independent of the resources and/or the corresponding resource-related computing devices, while still having access, based on policy or contracts, to those resources (and/or the corresponding resource-related computing devices). FIG. 35 illustrates the architectural distinctions between existing resource management systems and the iNodz system platform. The iNodz system maintains independence between the resource-owner domain and the platform domain while permitting, through access contracts (i.e. digital policy and communications and interfacing protocols implanted thorough designated resource-specific access criteria) established completely by the resource-owner (or other third-party to whom the necessary governance has been distributed), access to the platform domain to implement the underlying functionality for engaging and interacting as permitted. As such, any resource owner can create and instantiate new resources and then distribute any level of applicable governance to any other node, possibly up to and including the ability to instantiate and create new resources.

Through the ability to create truly autonomous virtual resources, whose owners can without limitation, establish and then distribute governance to any other resource or resource-owner, the iNodz provides for an open, organic (i.e. self-organizing), scalable system for managing resources; a system wherein the control and governance over resources will be necessarily driven to the resource owner and away from the platform owner. Since the owner is free to create child resources, which may have some or all of the characteristics and functions of its parent, albeit with a different identity or role, while still maintaining full control over the governance of that resource—even if aspects of the governance has been granted to another resource or class of resources—it is always available to the resource owner to withdraw such distributed governance. Such control and autonomy therefore present a strong incentive to resource owners to implement their resources as services, or intelligent agents, which can be made available to others who wish to exploit those resources. The exploiters will also be incentivized to utilize the intelligent agents because of the increased ability for exploitation as well as increased scope for utilization. In connection with platform- and user-independence, as partly described above, any resource or aspect thereof, can be made available as a service or resource to any other node, and ultimately, any other node owner, in accordance with the terms and conditions as set by the owner of that resource. for any given resource that has been registered on the iNodz platform, such as a printer, the resource owner can make an aspect of the printer available for colour printing during specific times of the day or week when the resource is not being used, or which it could be made available for an increased price. This aspect can be created as child resource of the printer, governance of which may be distributed to any other entity meeting specific criteria as specified by the resource owner.

An important enabler of the iNodz system is the ability for any resource owner to establish the necessary communications engine, including resource addressing, binding and operations information, to a centralized interoperability broker. In contradistinction from existing systems, in which the interfacing information is pushed to the resource, the centralized interoperability broker is configured to be supplied with the necessary protocol information such that all similar resources, or resources existing on the same network (whether open or closed) can utilize the same interfacing information. The communications interface is configured to accept the interfacing information from the resource owner in order to generate the interoperability engine—it does not require pushing the communications interface to the resource.

It should be noted that the interfacing information and/or interoperability engine are themselves resources of the iNodz system, the governance of which may be distributed to other nodes in accordance with the abilities described elsewhere herein. As such, the ability of like resources to interface with a resource that has been virtualized on the iNodz platform, through granting access (or indeed any higher level of governance over the domain of that interfacing resource) to other resource owners or class of resource owner.

In accordance with another aspect, there are provided methods for managing resources in accordance with one or more of the resource management systems, interfaces and resource agents disclosed herein, the method comprising: creating one or more resource agents, each such resource agent representative at least one resource-specific aspect of the resource and having associated therewith distributable digital resource governance permissions distributable by a first rights holder associated with said resource-specific aspect to a second rights holder resource-related computing device; assigning one or more distributable resource governance permissions to said resource agent, wherein one or more of said distributable resource governance permissions comprise a distribution permission, which, if granted by a first rights holder, allows a second rights holder to further distribute governance over said resource agent to one or more further rights holders. In some embodiments, the distributable resource governance permissions may comprise an ability to create additional resource agents based on the resource agent, to combine the resource agent or additional resource agents with other resource agents, to create orchestrations or choreographies comprising the resource agent or additional resource agents, among other distributable resource governance permissions disclosed herein. Said distributable resource governance permissions, in embodiments, are only limited (for both quantum and degree of divisibility of aspects of resources) for rights holders other than the creator (or other original rights holder of the resource agent) and then only to the extent that only some of the governance permissions have been distributed. The distribution of rights may either be accomplished by withholding existing permissions associated with the resource agent, or by generating new ones (and new aspects) associated with an additional resource agent, the additional resource agent being based on the resource agent.

In accordance with another aspect, there is provided a use of a resource management system disclosed herein for managing resources. Said use may, in some aspects, comprise obtaining information from a computer-implemented billing component for associating billing information, in some cases such billing information being further associated with a rights holder or a user of said resource agent, with usage of one or more of the following: the resource via the corresponding resource agent, the resource agent or the resource management platform.

Exemplary Use Cases

The following specific use cases are intended to illustrate possible applications of resource management systems described herein. They are not intended to limit the disclosure in any way but rather indicate alternative implementations and/or embodiments of the instantly disclosed subject matter.

Embodiments of the instantly disclosed subject matter may be utilized in a health care setting. Patient information (including different multimedia types, possibly as multiple resources) may be controlled by the patient who authorizes practitioners to access and add to their record. A resource can be instantiated on the platform wherein the resource is virtualized patient; governance over the virtual patient, or sub-resources thereof (e.g. a record of the patient's medical history), can be distributed to a class of medical professionals or other entities (e.g. insurance company). In such an example, a doctor may be granted sufficient governance over a sub-resource to enable them to create additional sub-resources, such as a vaccination record, and then grant other entities access rights over that vaccination record. At any time, the patient may, however, assuming they are the ultimate resource owner, revoke permissions over the parent resource, in this case the virtualized patient, thereby revoking the governance and other permissions over the sub-resources. As such, the patient can allow uses of their medical information with freedom not possible before, while still exerting control over the use of that information.

In a banking related embodiment, resources can be created relating to banking information. For example, an account holder can provide specific access to specific functions of their online banking for a defined period. Aspects of their banking can be made available to specific entities (or specific classes of entities) during certain times or when certain conditions are met. This may include the creation of sub-resources and the rights for establishing governance over such sub-resources; for example, a banking customer may grant their accountant specific access to certain types of accounts (e.g. their business accounts but not their personal accounts), and such accountant may have the governance rights to create sub-sub-resources that can be made available to others, such as government authorities over aspects of the business accounts (e.g. balance sheet information for a specified time period).

In another resource management example, there is supported herein a customer contact center. Localized travel agents with spare time can access a resource that allows them access to customers on a website. The travel agents can provide localized services collecting a fee from the website for each customer they serve. In this example, the real-time list of customers is a resource. Other resources that can be virtualized on the platform include the travel agent and the customer. Access to the real-time list of customers can be granted to the travel agents by the list-resource owner. A customer profile subresource may be granted by customers to the list-resource owner, including indications of satisfaction (or sales) resulting from travel agent interactions. A satisfied (or purchasing) customer response to the service provided causes the agent to be paid, possibly by the list-resource owner.

In another resource management example, there is provided an Agile enterprise business process. The resource management platform disclosed herein allows an enterprise to deliver business processes by utilizing a network of service providers. An example of its use may be the provisioning of a work team with one or more live communications services (including the following non-limiting examples: telephone extensions, VoIP, MMS), and/or email and a shared file server service. Each service can be provisioned, controlled and cancelled seamlessly. Each service provider resource can be provided to, or revoked from, a member of the work team with the appropriate permissions In another resource management example, there is provided a social media implementation. For example, a resource comprising one or more social media platform identities or persona can be generated by a person or entity who owns such an account (e.g. Facebook™, Twitter™, Instagram™, SnapChat™). The resource owner can provide access to social media functions to other users via the social media resource. For example, companies may want a social media presence on Facebook™ but want different company departments to control aspects of the site. Related communications (Facebook™ messenger) may be routed to the call center and handled as chat requests and the timeline content to be handled by the marketing department; the access and use of such communications may be a sub-resource generated by a delegate (i.e. a person or entity to whom the resource owner has granted sufficient governance to create and then distribute use and access rights to other third parties). The communications sub-resource can be distributed, in this example, to individuals within that department.

In another resource management example, there is provided a commercial printing service.—providing access to a printer resource allowing the segmentation of the printer's functions and providing access to them under different contracting terms. (Color printing vs black and white.)

In another resource management example, there is provided a content management system. Current content management is limited to web delivery of content. Embodiments of the disclosed subject matter could be configured to publish content to other channels. An example of this is an FAQ that is generated as a resource. The resource owner (or an authorized delegate having been granted sufficient governance) can then create a sub-resource that an SMS-based version of the FAQ; the SMS-based access published on the web is then also published to SMS. A user could send a natural language question via SMS where the SMS resource utilizes the FAQ to respond.

In another resource management example, there is provided a Single Sign On access system, wherein there is a consolidation of service credentials allowing single sign on. Users can register all of their resources and access them using a single sign on. Existing Single Sign On services are limited to common sign in standards (SAML, OpenSSO) and can not accommodate services that have unique standards or services that do not support designated authentication provider services.

In another resource management example, there is provided a mechanism for adding commerce to a resource. An example may include a resource comprising a .jpg image where access to the image may cost a fee. The fee may be a one time, per minute, monthly subscription or per connection or a mix of these models. Access may be conditioned on payment.

In another resource management example, there is provided a Smart Web application. For example, a content resource (such as lyrics to a song) may be registered to a service that provides copyright enforcement. The use of an artificial intelligence ("AI") service can be implemented by a resource agent that continuously crawls the internet finding exact or "fuzzy" matches" based on semantics that includes meaning and multi language support. Where exact, altered or plagiarized matches are flagged for review by the resource owner or delegate. A delegate may be given enforcement authority when matches are identified. In other embodiments, an AI service can be implemented as an iConnector for assessing relationships between resources (or resource agents). In one example, AI engines can be implemented as types of iLinkz (beyond conditional relationships) therefore enabling intelligent relationship processing between iNodz(s). This could include auto discovery and integration of iNodz in process completion for goals, rather then rigid pre-defined processes. Examples might include stock trading schemes as an example interpreting and responding to unstructured data reports (news). Instead of permitting resources or aspects thereof to be made available for access or control (including distributed governance) on the platform if certain conditions are met, an iLinkz process that establishes relationships between resources can be used to assess unstructured information to determine the existence of relevant information or circumstances and, based thereon, establish a connection between such resources. The AI engine may provide an avenue for an entity (or indeed the AI engine itself) to access and/or control the linked resources; such as, for example, assessing the existence of IP infringement, unauthorized activity or access, determination of patterns, indicia, evidence or other artifacts that may present opportunities or risks for a resource, resource agent, or other user of the platform.

While the present disclosure describes various exemplary embodiments, the disclosure is not so limited. To the contrary, the disclosure is intended to cover various modifications and equivalent arrangements included within the general scope of the present disclosure.

What is claimed is:

1. A computer-implemented resource management system, automatically implemented by one or more processors of a computing device, for managing remote control of a network-connected resource over a network, the system comprising:

a network-accessible resource management server having stored in association therewith an accessible digital data register:
        at least one resource agent connector associated with the resource, said at least one resource agent connector comprising digital resource connection information for providing access to control of one of one or more capabilities or one or more characteristics of said resources over the network via network connections thereto accessible by said server, and for each resource agent connector, at least one resource agent digitally representing, based on digital resource description information stored in said accessible digital data register, a corresponding selectable resource-specific aspect of the resource selected from at least one of one or more capabilities or one or more characteristics of said resource;

wherein each said resource agent connector is configured to provide access to control of the corresponding at least one selectable resource-specific aspect of the resource, using the digital resource connection information, to the corresponding resource agent by direct association therebetween or by indirect association therebetween via at least one second resource agent representing at least the same resource-specific aspect, said second resource agent implementing said control of the resource-specific aspect via a corresponding second resource agent connector of the at least one second resource agent based on the connection information received from the resource agent;

wherein each said resource agent having associated therewith selectively distributable digital resource governance permissions selectively distributable by an existing governance rights holder associated with said resource-specific aspect to a downstream governance rights holder; and wherein said selectively distributable digital resource governance permissions comprise a distribution permission, which, if granted by said existing governance rights holder, allows said downstream governance rights holder to further distribute at least one of said selectively distributable digital resource governance permissions over said resource-specific aspect to a further downstream governance rights holder, without prior authorization or limitation from any upstream rights holder, independently and autonomously of said resource, any corresponding resource connector, and any upstream resource agent, and wherein each said downstream governance rights holder implements the selectively distributable digital resource governance permissions distributed thereto, without prior authorization or limitation from any upstream rights holder, autonomously of any upstream governance rights holder and any upstream resource agent; and a communication interface server, said communication server comprising at least one processor and at least one network-enabled interface having access to said resource management server, wherein the resource has associated therewith a resource-related network accessible computing device addressable via said interface server and said resource agent is provided remote control to said resource via one or more resource connectors in accordance with a designated digital resource-specific control criteria distributed to said resource agent as part of said selectively distributable digital resource governance permissions;

wherein said selective distribution by the existing governance rights holder from said resource comprises the instantiation of additional resource agents comprising at least some of the at least one of one or more capabilities and one or more characteristics of said resource agent selected by said upstream user, each said one or more additional resource agents associated indirectly to said resource via said resource agent by a corresponding additional resource agent connector.

2. The system of claim 1, wherein said resource is a person, a place or a thing.

3. The system of claim 1, wherein a first said existing governance rights holder is defined by an owner of the resource distinct from an operator of said resource management platform.

4. The system of claim 1, wherein said selectively distributable digital resource governance permissions is defined by a discrete set of selectively distributable governance permissions, and wherein selective distribution of said selectively distributable digital resource governance permissions is limited to distributing no more than said discrete set of governance permissions.

5. The system of claim 1, wherein said resource agent is defined by an owner of said resource as an owner-defined representation of said corresponding resource-specific aspect.

6. The system of claim 1, wherein said resource-specific aspect comprises at least one of the resources, a profile of the resource, at least one service of the resource, at least one characteristic of the resource, at least one data describing the resource, and at least one authorization limitation.

7. The system of claim 1, wherein the resource-related network-accessible computing device comprises at least one of a network-accessible resource, a computing device associated with a corresponding non-network-accessible resource, and network of computing devices including the resource.

8. The system of claim 1, wherein said distributable digital resource governance permissions comprise an autonomy authorization for said resource agent to respond to a resource request without obtaining prior approval from an upstream rights holder.

9. The system of claim 8, wherein the resource agent is configured to participate, in response to the resource request, in communications between the resource-related network-accessible computing device associated with said resource agent via the communications interface.

10. The system of claim 9, wherein said communications include control information relating to the response request.

11. The system of claim 1, wherein the distributable digital resource governance permissions comprise a distributable access rights permission associated with the designated resource-specific access criteria and distributable to said further downstream governance rights holder.

12. The system of claim 1, wherein the distributable digital resource governance permissions comprise a distributable agent creation permission to generate a further resource agent based on an existing resource agent, wherein said further resource agent shares at least one aspect of the existing resource agent.

13. The system of claim 1, wherein a given rights holder is selectable from an individual and another resource agent.

14. The system of claim 1, wherein the network-accessible resource management platform has stored in association therewith multiple resource agents representing corresponding resource-specific aspects of the resource and each having associated therewith respective distributable digital resource governance permissions.

15. The system of claim 14, wherein said multiple resource agents are interoperable.

16. The system of claim 15, where an interoperability of said multiple resource agents is controllable by their said respective distributable digital resource governance permissions.

17. The system of claim 14, wherein different resource agents for a same resource are selectively concurrently governable by distinct governance rights holders.

18. The system of claim 1, wherein said resource agent represents a virtualization of said corresponding resource-specific aspect.

19. The system of claim 1, wherein different governance permissions granted to said existing rights holder for a same resource agent are selectively distributable to distinct downstream governance rights holders.

20. A communications interface computing device for interfacing, over a communication network, a resource-related computing device with resource agents via a resource agent connector associated with the resource-related computing device, said at least one resource agent connector comprising digital resource connection information stored in an accessible digital data register for providing access to control of one of one or more capabilities or one or more characteristics of said resources, each of said resource agents being implemented on a network-accessible resource management computing device and digitally representing, based on digital resource description information stored in said accessible digital data register, a corresponding selectable resource-specific aspect of a resource associated with the resource-related computing device, said resource-specific aspect selected from at least one of one or more capabilities or one or more characteristics of said resource, each said resource agent connector configured to provide control of the corresponding at least one selectable resource-specific aspect of the resource-related computing device to the corresponding resource agent, said resource agent connectors connecting said resource-related computing device and said resource agent by direct association therebetween, or by indirect association therebetween via at least one second resource agent representing at least the same resource-specific aspect, each said at least one resource agent implementing said control of the resource-specific aspect via a corresponding second resource agent connector of each at least one second resource agent based on the corresponding connection information, the communications interface computing device comprising:
at least one processor; and
at least one network communications bus, having access to said resource management computing device and being configured to accept interoperability information relating to a communications protocol from an existing rights holder, said interoperability information configured to enable communications to the communications interface computing device by the resource-related computing device that communicates in accordance with said communications protocol;
wherein said interoperability information has associated therewith distributable digital resource governance permissions for implementing governance control over a given resource-specific aspect of a given resource by a given corresponding resource agent, said distributable digital resource governance permissions distributable by said existing rights holder to a downstream rights holder, wherein said distributable digital resource governance permissions comprise a distribution permission, which, if granted by said existing rights holder, allows said downstream rights holder to further distribute governance over said interoperability information, without prior authorization or limitation from any upstream rights holder, independently and autonomously of the corresponding resource-related computing device, any corresponding resource connector, and any upstream resource agent, to a further downstream rights holder, wherein each said downstream governance rights holder implements distributed governance permissions distributed thereto, without prior authorization or limitation from any upstream rights holder, autonomously of any upstream governance rights holder and any upstream resource agent through instantiation of one or more additional resource agents connected by corresponding additional resource agent connectors to the given corresponding resource agent for controlling at least some of the at least one of one or more capabilities and one or more characteristics selected by said upstream user via the given corresponding resource agent and its corresponding resource agent connector; and
wherein said resource agent to is provided remote control to said resource-related computing device via said resource connector, directly or indirectly, in accordance with a designated digital resource-specific access control criteria distributed as part of said distributable digital resource governance permissions.

21. The computing device of claim 20, wherein said resource is a person, a place or a thing.

22. The computing device of claim 20, wherein a first said existing governance rights holder is defined by an owner of the resource distinct from an operator of said resource management platform.

23. The computing device of claim 20, wherein said selectively distributable digital resource governance permissions is defined by a discrete set of selectively distributable governance permissions, and wherein selective distribution of said selectively distributable digital resource governance permissions is limited to distributing no more than said discrete set of governance permissions.

24. The computing device of claim 20, wherein said resource agent is defined by an owner of said resource as an owner-defined representation of said corresponding resource-specific aspect.

25. The computing device of claim 20, wherein said resource-specific aspect comprises at least one of a profile of the resource, a service of the resource, a characteristic of the resource, at least one data describing the resource, and at least one authorization limitation.

26. The computing device of claim 20, wherein the resource-related computing device comprises at least one of a resource computing device associated with a corresponding non-network-interfaceable resource, and a network of comprising one or more of said resource computing devices.

27. The computing device of claim 20, wherein said resource agents are interoperable.

28. The computing device of claim 27, where an interoperability of said resource agents is controllable by their respective distributable digital resource governance permissions.

29. The computing device of claim 20, wherein each of said resource agents represents a respective virtualization of its said corresponding resource-specific aspect.

30. The computing device of claim 20, wherein different resource agents for a same resource are selectively concurrently governable by distinct governance rights holders.

31. The computing device of claim 20, wherein different governance permissions granted to said existing rights holder for a same resource agent are selectively distributable to distinct downstream governance rights holders.

\* \* \* \* \*